(12) United States Patent
Viswanath et al.

(10) Patent No.: US 10,802,706 B2
(45) Date of Patent: *Oct. 13, 2020

(54) METHOD AND SYSTEM FOR FACILITATING CONSUMER INTERACTIONS FOR PERFORMING PURCHASE COMMANDS

(71) Applicant: Groupon, Inc., Chicago, IL (US)

(72) Inventors: Sri Viswanath, Palo Alto, CA (US); Eric Hyche, Kingsport, TN (US); Mihir Shah, San Francisco, CA (US); Peter Bergstrom, Mountain View, CA (US); Michael Burton, San Francisco, CA (US); Dor Levi, San Francisco, CA (US); Fabio Sisinni, Mountain View, CA (US); Don Albert Chennavasin, Santa Clara, CA (US); Marius G. Ciocirlan, Mountain View, CA (US); Ben Kim, Sunnyvale, CA (US); Riaz Rahim, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/138,484

(22) Filed: Sep. 21, 2018

(65) Prior Publication Data

US 2019/0163357 A1     May 30, 2019

Related U.S. Application Data

(63) Continuation of application No. 14/626,363, filed on Feb. 19, 2015, now Pat. No. 10,115,105.

(Continued)

(51) Int. Cl.
*G06Q 30/00*   (2012.01)
*G06F 3/0488*  (2013.01)
(Continued)

(52) U.S. Cl.
CPC ........ *G06F 3/04883* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS

| 5,337,149 A | 8/1994 | Kozah et al. |
| 5,944,784 A | 8/1999 | Simonoff et al. |

(Continued)

FOREIGN PATENT DOCUMENTS

| KR | 10-2011-0113931 A | 10/2011 |
| WO | 2008/076474 A2 | 6/2008 |

(Continued)

OTHER PUBLICATIONS

U.S. Patent Application filed Feb. 19, 2015; In re: Viswanath et al., entitled "Method and System for Use of biometric Information Associated With Consumer Interaction", U.S. Appl. No. 14/626,384.

(Continued)

*Primary Examiner* — William J Allen
(74) *Attorney, Agent, or Firm* — Alston & Bird LLP

(57) ABSTRACT

Embodiments provide a computer-executed method, a computer system and computer-program product for facilitating a transaction. The method includes transmitting computer-executable instructions to cause a representation of an item to be displayed on a consumer interface rendered on a visual display of a computing device. The method also includes receiving, from the computing device, an indication of a compound consumer input associated with a consumer and performed using the consumer interface. The method further includes, based on a determination that the compound consumer input corresponds to a purchase command, retrieving (Continued)

information previously stored for the consumer, generating an order to purchase the item for the consumer, and transmitting an order confirmation configured to be displayed by the computing device.

40 Claims, 23 Drawing Sheets

Related U.S. Application Data

(60) Provisional application No. 62/017,783, filed on Jun. 26, 2014, provisional application No. 62/017,776, filed on Jun. 26, 2014, provisional application No. 62/017,781, filed on Jun. 26, 2014, provisional application No. 62/017,795, filed on Jun. 26, 2014, provisional application No. 62/017,787, filed on Jun. 26, 2014, provisional application No. 62/017,793, filed on Jun. 26, 2014, provisional application No. 61/943,242, filed on Feb. 21, 2014.

(51) Int. Cl.
| | |
|---|---|
| *G06Q 20/12* | (2012.01) |
| *G06Q 20/32* | (2012.01) |
| *G06Q 30/06* | (2012.01) |
| *G06F 3/0484* | (2013.01) |
| *G06F 3/0486* | (2013.01) |
| *G06Q 30/02* | (2012.01) |
| *G06F 3/0482* | (2013.01) |

(52) U.S. Cl.
CPC ........ *G06F 3/0488* (2013.01); *G06F 3/04842* (2013.01); *G06Q 20/12* (2013.01); *G06Q 20/322* (2013.01); *G06Q 30/0207* (2013.01); *G06Q 30/0267* (2013.01); *G06Q 30/0601* (2013.01); *G06Q 30/0633* (2013.01); *G06Q 30/0635* (2013.01); *G06Q 30/0641* (2013.01); *G06Q 30/0643* (2013.01)

(56) References Cited

U.S. PATENT DOCUMENTS

| | | | |
|---|---|---|---|
| 6,157,705 | A | 12/2000 | Perrone |
| 7,313,802 | B1 | 12/2007 | Tomsen |
| 8,122,371 | B1 | 2/2012 | Keller et al. |
| 8,190,486 | B1 | 5/2012 | Ouimet |
| 8,364,590 | B1 | 1/2013 | Casey et al. |
| 8,436,821 | B1 | 5/2013 | Plichta et al. |
| 8,478,664 | B1 | 7/2013 | Xavier et al. |
| 8,610,682 | B1 | 12/2013 | Fulcher et al. |
| 9,535,906 | B2 | 1/2017 | Lee et al. |
| 9,733,739 | B1 | 8/2017 | Yates et al. |
| 2002/0016744 | A1 | 2/2002 | Mitsuoka et al. |
| 2002/0095508 | A1 | 7/2002 | Okazawa |
| 2003/0018531 | A1 | 1/2003 | Mahaffy et al. |
| 2006/0041828 | A1 | 2/2006 | King et al. |
| 2007/0145680 | A1 | 6/2007 | Rosenberg |
| 2007/0177803 | A1 | 8/2007 | Elias et al. |
| 2008/0004957 | A1 | 1/2008 | Hildreth et al. |
| 2008/0090513 | A1 | 4/2008 | Collins et al. |
| 2008/0168403 | A1 | 7/2008 | Westerman et al. |
| 2009/0171804 | A1 | 7/2009 | Lee et al. |
| 2010/0011354 | A1 | 1/2010 | Gharabally et al. |
| 2010/0085318 | A1 | 4/2010 | Lee et al. |
| 2010/0241842 | A1 | 9/2010 | Acedo et al. |
| 2011/0227947 | A1 | 9/2011 | Benko et al. |
| 2011/0282785 | A1 | 11/2011 | Chin |
| 2011/0320343 | A1 | 12/2011 | Koh et al. |
| 2012/0011458 | A1 | 1/2012 | Xia et al. |
| 2012/0044179 | A1* | 2/2012 | Hudson ............... G06F 3/04883 345/173 |
| 2012/0047146 | A1 | 2/2012 | Balakrishnan et al. |
| 2012/0169632 | A1 | 7/2012 | Yu |
| 2012/0198026 | A1 | 8/2012 | Roy et al. |
| 2012/0215656 | A1 | 8/2012 | Chen |
| 2012/0324374 | A1 | 12/2012 | Karmon et al. |
| 2013/0006957 | A1 | 1/2013 | Huang et al. |
| 2013/0039531 | A1 | 2/2013 | Basso et al. |
| 2013/0080319 | A1 | 3/2013 | Greenstone |
| 2013/0191789 | A1 | 7/2013 | Calman et al. |
| 2013/0218463 | A1 | 8/2013 | Howard et al. |
| 2013/0326395 | A1 | 12/2013 | Oh et al. |
| 2014/0006070 | A1 | 1/2014 | Stamler |
| 2014/0168077 | A1 | 6/2014 | Hicks et al. |
| 2014/0188606 | A1 | 7/2014 | Moore et al. |
| 2014/0358782 | A1 | 12/2014 | Gura et al. |
| 2014/0370937 | A1 | 12/2014 | Park et al. |
| 2015/0006385 | A1* | 1/2015 | Shah ................ G06Q 20/40145 705/44 |
| 2015/0058810 | A1 | 2/2015 | Chang |
| 2015/0153924 | A1 | 6/2015 | Felt et al. |
| 2015/0212683 | A1 | 7/2015 | Arita et al. |
| 2015/0213448 | A1 | 7/2015 | Subbaraj |
| 2015/0234572 | A1 | 8/2015 | Arita et al. |
| 2017/0337555 | A1 | 11/2017 | Subbaraj |
| 2020/0142559 | A1 | 5/2020 | Mumick |

FOREIGN PATENT DOCUMENTS

| | | |
|---|---|---|
| WO | 2011/085113 A2 | 7/2011 |
| WO | 2013/181662 A2 | 12/2013 |

OTHER PUBLICATIONS

U.S. Patent Application filed Feb. 19, 2015; In re: Viswanath et al., entitled "Method and System for Facilitating Consumer Interactions With Promotions", U.S. Appl. No. 14/626,373.
U.S. Patent Application filed Feb. 19, 2015; In re: Viswanath et al., entitled Method and System for Defining Consumer Interactions for Initiating Execution of Commands, U.S. Appl. No. 14/626,381.
U.S. Patent Application filed Feb. 19, 2015; In re: Viswanath et al., entitled "Method and System for Adjusting Item Relevance Based on Consumer Interactions", U.S. Appl. No. 14/626,395.
Supplementary European Search Report for Application No. EP 15 75 1378 dated Sep. 4, 2017, 9 pages.
Supplementary European Search Report for Application No. EP 15 75 1378 dated Sep. 4, 2017, 3 pages.
International Search Report and Written Opinion for Application No. PCT/US2015/016820 dated Jun. 8, 2015.
Google Gesture Search [online] [retrieved Apr. 29, 2015]. Retrieved from the Internet; <URL: https://play.goggle.com/store/apps/details?id=com.google.android.apps.gest uresearch>. (dated Jan. 27, 2015) 4 pages.
Gesture [online] [retrieved Apr. 29, 2015]. Retrieved from the Internet: <URL: https://play.google.com/store/apps/details?id=com.pm.gesto>. (dated Sep. 10, 2014) 3 pages.
All in one Gestures [online] [retrieved Apr. 29, 2015]. Retrieved from the Internet: <URL: https://play.google.com/store/apps/details?id=com.phoenixstudios.aiogestur es>. (dated Apr. 12, 2015) 2 pages.
Ben Pickering, How to use social partnership to amplify your marketing, 2011 (Year: 2011).
U.S. Appl. No. 14/626,383, filed Feb. 19, 2015, U.S. Pat. No. 10,115,105, Patented.
Alex Rawson, Ewan Duncan and Conor Jones, The Truth About Customer Experience, 2013 (Year: 2013).

* cited by examiner

1300

— 1302

— 1304

1300

1304

1400

METHOD AND SYSTEM FOR FACILITATING CONSUMER INTERACTIONS FOR PERFORMING PURCHASE COMMANDS

CROSS-REFERENCE TO RELATED APPLICATIONS

The present application is a continuation of U.S. application Ser. No. 14/626,363, titled "Method and System for Facilitating Consumer Interactions for Performing Purchase Commands," and filed Feb. 19, 2015, which application claims the benefit of: (i) U.S. Provisional Patent Application No. 62/017,783, titled "Method and System for Facilitating Consumer Interactions with Promotions" and filed Jun. 26, 2014; (ii) U.S. Provisional Patent Application No. 62/017,781, titled "Method and System for a Predefined Suite of Consumer Interactions for Initiating Execution of Commands" and filed Jun. 26, 2014; (iii) U.S. Provisional Patent Application No. 62/017,787, titled "Method and System for Defining Consumer Interactions for Initiating Execution of Commands" and filed Jun. 26, 2014; (iv) U.S. Provisional Patent Application No. 62/017,795, titled "Method and System for Adjusting Item Relevance Based on Consumer Interactions" and filed Jun. 26, 2014; (v) U.S. Provisional Patent Application No. 62/017,793, titled "Method and System for Use of Biometric Information Associated with Consumer Interactions" and filed Jun. 26, 2014; (vi) U.S. Provisional Patent Application No. 62/017,776, titled "Method and System for Facilitating Consumer Interactions for Performing Purchase Commands" and filed Jun. 26, 2014; and (vii) U.S. Provisional Patent Application No. 61/943,242, filed Feb. 21, 2014, titled "Mobile Device Consumer Interactions." The entire contents of each of the above-referenced patent applications are expressly incorporated herein by reference in their entireties.

TECHNOLOGICAL FIELD

Example embodiments of the present invention relate generally to facilitating promotion management via an intuitive interface and, more particularly, to facilitating consumer interactions with promotions and impressions of promotions via an improved mobile device.

BACKGROUND

Providers offer products, services, and/or experiences (referred to herein as "items") to consumers. Promotional systems provide promotions for such items to consumers. Consumers can use consumer devices (e.g., a mobile device such as a smartphone, tablet, etc.) to interact with the promotional system for a variety of purposes including accessing information about promotions and purchasing promotions. The nature of such interactions affects the shopping experience and even the likelihood or rate of promotion purchase. Applicant has identified a number of deficiencies and problems associated with conventional interfaces and computing devices. Through applied effort, ingenuity, and innovation, solutions to improve such techniques and devices have been realized and are described herein.

BRIEF SUMMARY

In accordance with one exemplary embodiment, a computer-executed method is provided for facilitating a transaction. The method includes transmitting computer-executable instructions to cause a representation of an item to be displayed on a consumer interface rendered on a visual display of a computing device. The method also includes receiving, from the computing device, an indication of a compound consumer input associated with a consumer and performed using the consumer interface. The method further includes, based on a determination that the compound consumer input corresponds to a purchase command, retrieving information previously stored for the consumer, generating an order to purchase the item for the consumer, and transmitting an order confirmation configured to be displayed by the computing device.

The method may further include causing the consumer interface to display a consumer input definition interface including an indication of the purchase command; while the consumer input definition interface is displayed, the method may include receiving input definition data defining a consumer interaction by the consumer; generating the compound consumer input based on the input definition data; associating the compound consumer input with the purchase command; and storing the association among the compound consumer input, the purchase command and the consumer on a non-transitory storage device.

In some embodiments, the method may include causing the consumer interface to display a second consumer input definition interface including an indication of a second command; while the second consumer input definition interface is displayed, receiving second input definition data defining a second consumer interaction by the consumer; generating a second compound consumer input based on the second input definition data; associating the second compound consumer input with the second command; and storing the association among the second compound consumer input, the second command and the consumer on a non-transitory storage device. Receipt of the compound consumer input from the consumer interface of the consumer may initiate the purchase command for the consumer, and receipt of the second compound consumer input from the consumer interface of the consumer may initiate the second command for the consumer.

Some embodiments of the method may include transmitting computer-executable instructions to cause a second consumer input definition interface to be displayed on a second consumer interface rendered on a second visual display of a second computing device associated with a second consumer; causing the second consumer interface to display a second consumer input definition interface including an indication of the purchase command; while the second consumer input definition interface is displayed, receiving second input definition data defining a second consumer interaction by the consumer; generating a second compound consumer input based on the second input definition data; associating the second compound consumer input with the purchase command; and storing the association among the second compound consumer input, the purchase command and the second consumer on a non-transitory storage device. Receipt of the compound consumer input from the consumer interface of the consumer may initiate the purchase command for the consumer, and wherein receipt of the second compound consumer input from the second consumer interface of the second consumer may initiate the purchase command for the second consumer.

The compound consumer input may include one or more of: a checkmark selection, a multi-point touchscreen press action, a mouse click action, a touchscreen tap action, a touchscreen press and hold action, a touchscreen drag and drop action, a touchscreen pinch action, a touchscreen unpinch action, a touchscreen swipe action, a touchscreen slide action, a touchscreen press action, a touchscreen pull-down action, a device shake action, a device twist action, a movement of the computing device, a change in orientation of the computing device, a touchscreen writing action, a touchscreen drawing or writing motion, a touchscreen selection of one or more alphanumeric characters, a keyboard action, a mouse action, a static or moving gesture captured by a camera, or a speaking of a sound.

In some embodiments, the purchase command may initiate purchase of the item without associating the item with an electronic shopping cart. The consumer interface may include a representation of an electronic shopping cart or a representation of a purchase drop region, and the purchase command may be initiated upon the compound consumer input overlapping with the representation of the shopping cart representation or the representation of the purchase drop region.

The compound consumer input may be a continuous touch interaction using a touchscreen, defined by: a first point at a first time; a second point at a second time subsequent to the first time; and a third point at a third time subsequent to the second time. In such an embodiment, the first, second and third points may not be collinear. In some embodiments, the compound consumer input is a continuous touch interaction using a touchscreen, defined by a point held for at least a predefined amount of time. The continuous touch interaction may be further defined by at least a second point at a second time subsequent to the predefined amount of time. Some embodiments of the the compound consumer input include a continuous touch interaction using a touchscreen, defined by: a first point at a first time; and a second point at a second time subsequent to the first time. The first point and the second point may define a predetermined first direction from the first point to the second point.

In some embodiments a first portion of the consumer input may be associated with the purchase command, and wherein a second portion of the consumer input may be associated with a second command. The method may further include transmitting computer-executable instructions to alter the consumer interface in response to receiving an indication of the second command.

The second command may include a request command, and the method may further include, in response to receiving an indication of the second command, transmitting computer-executable instructions to cause a second representation for a second item to be rendered on the consumer interface. In some embodiments, the second command may include a cancel purchase command, and wherein the method may further include, in response to receiving an indication of the second command, transmitting computer-executable instructions to cause cancellation of a purchase of the item. The second command may include a quantity command defining a number of instances of the item selected for purchase, and the method may further include, in response to receiving an indication of the second command, transmitting computer-executable instructions to cause facilitating purchase of one or more instances of the item based on the quantity command. Some embodiments of the second command include a relevance indicator command, and the method may further include, in response to receiving an indication of the second command, transmitting computer-executable instructions to cause: determining one or more parameters of the item; associating or dissociating the one or more parameters with a consumer account as being relevant to the consumer account; and determining a second item different from the purchased item based on the one or more parameters.

Some embodiments of the method may further comprise associating a third consumer input with a third command; receiving third consumer input data indicating a third consumer interaction with the representation of the item; and in response to receiving the third consumer input: determining whether the third command has been initiated based on the third consumer input, and processing the third command when the third command has been initiated. The second command may include a details command requesting details of the item, and the third command may additionally or alternatively include a cancel purchase command requesting cancelation of purchase of the item.

The method may include determining a location of the computing device; determining a language associated with the location; and associating the compound consumer input with the purchase command based at least in part on the language.

In some embodiments, consumer input includes a plurality of discontinuous interactions at substantially a single location on the surface of a touchscreen. In some embodiments, an interaction comprises a continuous touch interaction defined by, on the surface of the touchscreen: a first point at a first time within the interaction region; a second point a second time at a purchase drop region of the consumer interface, wherein the second time is subsequent to the first point; and a discontinuation of the continuous touch interaction subsequent to the second time.

Embodiments of the method may include, in response to determining that the purchase command has been initiated, facilitating the transaction without requesting a subsequent purchase confirmation.

Some embodiments of the method may include, prior to receiving the compound consumer input, sending a request to the computing device for approval of facilitating the transaction without requesting subsequent purchase confirmation; receiving payment data from the computing device; storing the payment data; and subsequent to receiving consumer approval data indicating approval of facilitating the transaction without requesting the subsequent purchase confirmation, facilitating the transaction with the payment data.

The consumer interface may display a geographical map of a plurality of locations at which the item may be purchased, and a location of the consumer input on the map may correspond to a geographical location for which the item is purchased.

In some embodiments, the item may be a promotion, the representation of the item may be an impression, and the purchase command may be a command for initiating purchase of the promotion for the consumer.

In some embodiments, the computing device may be a mobile computing device, and the consumer interface may be rendered by a promotion application program executing on the mobile computing device. The consumer interface may additionally or alternatively be rendered by an email application program. The consumer interface may additionally or alternatively be rendered by a mobile push notification protocol.

In some embodiments, the purchase command may be predetermined to be associated with the compound consumer input.

The method may include detecting a speed of the compound consumer input on the consumer interface. In such embodiments, the order may be generated based on a determination that the speed of the compound consumer input satisfies a predetermined threshold speed.

Some embodiments of the method may further include detecting a speed of the compound consumer input on the consumer interface; and upon determining that the speed does not satisfy a predetermined speed threshold, displaying a purchase confirmation interface configured to enable user input for confirming or rejecting the purchase command. The order may be generated if user input confirming the purchase command is received at the purchase confirmation interface.

In some embodiments, the method may include detecting a distance on the consumer interface covered by the compound consumer input. The order may be generated based on a determination that the distance on the consumer interface covered by the compound consumer input satisfies a predetermined threshold distance.

Embodiments of the method may further include detecting a distance on the consumer interface covered by the compound consumer input; and upon determining that the distance does not satisfy a predetermined distance threshold, displaying a purchase confirmation interface configured to enable user input for confirming or rejecting the purchase command. The order may be generated if user input confirming the purchase command is received at the purchase confirmation interface.

The method may include detecting a time period during which the compound consumer input is provided at the consumer interface, and the order may be generated based on a determination that the time period satisfies a predetermined threshold time period.

Some embodiments of the method may include detecting a time period during which the compound consumer input is provided at the consumer interface; and upon determining that the time period does not satisfy a predetermined time threshold, displaying a purchase confirmation interface configured to enable user input for confirming or rejecting the purchase command. The order may be generated if user input confirming the purchase command is received at the purchase confirmation interface.

The method may further include displaying a consumer interaction region on the consumer interface. The compound consumer input may be a continuous slide action or a pull-down action performed on the consumer interaction region.

In some embodiments, the method may further include displaying a consumer instruction on the compound consumer input at the consumer interaction region. Additionally or alternatively, the method may include displaying an indicator to indicate a progress of the compound consumer input as it is provided on the consumer interface.

The method may further include, based on a determination that the compound consumer input corresponds to a purchase confirmation command, displaying a purchase confirmation interface on the consumer interface.

In accordance with another exemplary embodiment, a computer system is provided for facilitating a transaction. The computer system includes a processor programmed or configured to transmit computer-executable instructions to cause a representation of an item to be displayed on a consumer interface rendered on a visual display. The processor is also programmed or configured to receive, from the computing device, an indication of a compound consumer input associated with a consumer and performed using the consumer interface. The processor is also programmed or configured to, based on a determination that the compound consumer input corresponds to a purchase command, retrieve information previously stored for the consumer, generate an order to purchase the item for the consumer, and transmit an order confirmation configured to be displayed by the computing device.

The computer system may be further configured to the consumer interface to display a consumer input definition interface including an indication of the purchase command; while the consumer input definition interface is displayed, the computer system may be further configured to receive input definition data defining a consumer interaction by the consumer; generate the compound consumer input based on the input definition data; associate the compound consumer input with the purchase command; and store the association among the compound consumer input, the purchase command and the consumer on a non-transitory storage device.

In some embodiments, the computer system may be configured to cause the consumer interface to display a second consumer input definition interface including an indication of a second command; while the second consumer input definition interface is displayed, receive second input definition data defining a second consumer interaction by the consumer; generate a second compound consumer input based on the second input definition data; associate the second compound consumer input with the second command; and store the association among the second compound consumer input, the second command and the consumer on a non-transitory storage device. Receipt of the compound consumer input from the consumer interface of the consumer may initiate the purchase command for the consumer, and receipt of the second compound consumer input from the consumer interface of the consumer may initiate the second command for the consumer.

Some embodiments of the computer system may be configured to transmit computer-executable instructions to cause a second consumer input definition interface to be displayed on a second consumer interface rendered on a second visual display of a second computing device associated with a second consumer; cause the second consumer interface to display a second consumer input definition interface including an indication of the purchase command; while the second consumer input definition interface is displayed, receive second input definition data defining a second consumer interaction by the consumer; generate a second compound consumer input based on the second input definition data; associate the second compound consumer input with the purchase command; and store the association among the second compound consumer input, the purchase command and the second consumer on a non-transitory storage device. Receipt of the compound consumer input from the consumer interface of the consumer may initiate the purchase command for the consumer, and receipt of the second compound consumer input from the second consumer interface of the second consumer may initiate the purchase command for the second consumer.

The compound consumer input may include one or more of: a checkmark selection, a multi-point touchscreen press action, a mouse click action, a touchscreen tap action, a touchscreen press and hold action, a touchscreen drag and drop action, a touchscreen pinch action, a touchscreen unpinch action, a touchscreen swipe action, a touchscreen slide action, a touchscreen press action, a touchscreen pull-down action, a device shake action, a device twist action, a movement of the computing device, a change in orientation of the computing device, a touchscreen writing action, a touchscreen drawing or writing motion, a touchscreen selection of one or more alphanumeric characters, a keyboard action, a mouse action, a static or moving gesture captured by a camera, or a speaking of a sound.

In some embodiments, the purchase command may be configured to initiate purchase of the item without associating the item with an electronic shopping cart. The consumer interface may include a representation of an electronic shopping cart or a representation of a purchase drop region, and the purchase command may be initiated upon the compound consumer input overlapping with the representation of the shopping cart representation or the representation of the purchase drop region.

The compound consumer input may be a continuous touch interaction using a touchscreen, defined by: a first point at a first time; a second point at a second time subsequent to the first time; and a third point at a third time subsequent to the second time. In such an embodiment, the first, second and third points may not be collinear. In some embodiments, the compound consumer input is a continuous touch interaction using a touchscreen, defined by a point held for at least a predefined amount of time. The continuous touch interaction may be further defined by at least a second point at a second time subsequent to the predefined amount of time. Some embodiments of the compound consumer input include a continuous touch interaction using a touchscreen, defined by: a first point at a first time; and a second point at a second time subsequent to the first time. The first point and the second point may define a predetermined first direction from the first point to the second point.

In some embodiments a first portion of the consumer input may be associated with the purchase command, and wherein a second portion of the consumer input may be associated with a second command. The computer system may be further configured to transmit computer-executable instructions to alter the consumer interface in response to receiving an indication of the second command.

The second command may include a request command, and the computer system may be further configured to, in response to receiving an indication of the second command, transmit computer-executable instructions to cause a second representation for a second item to be rendered on the consumer interface. In some embodiments, the second command may include a cancel purchase command, and computer system may be further configured to, in response to receiving an indication of the second command, transmit computer-executable instructions to cause cancellation of a purchase of the item. The second command may include a quantity command defining a number of instances of the item selected for purchase, and computer system may be further configured to, in response to receiving an indication of the second command, transmit computer-executable instructions to cause facilitating purchase of one or more instances of the item based on the quantity command. Some embodiments of the second command include a relevance indicator command, and computer system may be further configured to, in response to receiving an indication of the second command, transmit computer-executable instructions to cause: determining one or more parameters of the item; associating or dissociating the one or more parameters with a consumer account as being relevant to the consumer account; and determining a second item different from the purchased item based on the one or more parameters.

Some embodiments of the computer system may be further configured to associate a third consumer input with a third command; receive third consumer input data indicating a third consumer interaction with the representation of the item; and in response to receiving the third consumer input: determine whether the third command has been initiated based on the third consumer input, and process the third command when the third command has been initiated. The second command may include a details command requesting details of the item, and the third command may additionally or alternatively include a cancel purchase command requesting cancelation of purchase of the item.

Computer system may be further configured to determine a location of the computing device; determine a language associated with the location; and associate the compound consumer input with the purchase command based at least in part on the language.

In some embodiments, consumer input includes a plurality of discontinuous interactions at substantially a single location on the surface of a touchscreen. In some embodiments, an interaction comprises a continuous touch interaction defined by, on the surface of the touchscreen: a first point at a first time within the interaction region; a second point a second time at a purchase drop region of the consumer interface, wherein the second time is subsequent to the first point; and a discontinuation of the continuous touch interaction subsequent to the second time.

Embodiments of the computer system may be further configured to, in response to determining that the purchase command has been initiated, facilitate the transaction without requesting a subsequent purchase confirmation.

Some embodiments of the computer system may be further configured to, prior to receiving the compound consumer input, send a request to the computing device for approval of facilitating the transaction without requesting subsequent purchase confirmation; receive payment data from the computing device; store the payment data; and subsequent to receiving consumer approval data indicating approval of facilitating the transaction without requesting the subsequent purchase confirmation, facilitate the transaction with the payment data.

The consumer interface may display a geographical map of a plurality of locations at which the item may be purchased, and a location of the consumer input on the map may correspond to a geographical location for which the item is purchased.

In some embodiments, the item may be a promotion, the representation of the item may be an impression, and the purchase command may be a command for initiating purchase of the promotion for the consumer.

In some embodiments, the computing device may be a mobile computing device, and the consumer interface may be rendered by a promotion application program executing on the mobile computing device. The consumer interface may additionally or alternatively be rendered by an email application program. The consumer interface may additionally or alternatively be rendered by a mobile push notification protocol.

In some embodiments, the purchase command may be predetermined to be associated with the compound consumer input.

The computer system may be further configured to detect a speed of the compound consumer input on the consumer interface. In such embodiments, the order may be generated based on a determination that the speed of the compound consumer input satisfies a predetermined threshold speed.

Some embodiments of computer system may be further configured to detect a speed of the compound consumer input on the consumer interface; and upon determining that the speed does not satisfy a predetermined speed threshold, display a purchase confirmation interface configured to enable user input for confirming or rejecting the purchase command. The order may be generated if user input confirming the purchase command is received at the purchase confirmation interface.

In some embodiments, the computer system may be further configured to detect a distance on the consumer interface covered by the compound consumer input. The order may be generated based on a determination that the distance on the consumer interface covered by the compound consumer input satisfies a predetermined threshold distance.

Embodiments of the computer system may be further configured to detect a distance on the consumer interface covered by the compound consumer input; and upon determining that the distance does not satisfy a predetermined distance threshold, display a purchase confirmation interface configured to enable user input for confirming or rejecting the purchase command. The order may be generated if user input confirming the purchase command is received at the purchase confirmation interface.

The computer system may be further configured to detect a time period during which the compound consumer input is provided at the consumer interface, and the order may be generated based on a determination that the time period satisfies a predetermined threshold time period.

Some embodiments of the computer system may be further configured to detect a time period during which the compound consumer input is provided at the consumer interface; and upon determining that the time period does not satisfy a predetermined time threshold, display a purchase confirmation interface configured to enable user input for confirming or rejecting the purchase command. The order may be generated if user input confirming the purchase command is received at the purchase confirmation interface.

The computer system may be further configured to display a consumer interaction region on the consumer interface. The compound consumer input may be a continuous slide action or a pull-down action performed on the consumer interaction region.

In some embodiments, the computer system may be further configured to include displaying a consumer instruction on the compound consumer input at the consumer interaction region. Additionally or alternatively, the computer system may be further configured to display an indicator to indicate a progress of the compound consumer input as it is provided on the consumer interface.

The computer system may be further configured to, based on a determination that the compound consumer input corresponds to a purchase confirmation command, display a purchase confirmation interface on the consumer interface.

In accordance with another exemplary embodiment, a non-transitory computer readable medium having computer program instructions stored therein, said instructions when executed by a processor configured to facilitate a transaction. The computer program product is configured to facilitate the transaction by transmitting computer-executable instructions to cause a representation of an item to be displayed on a consumer interface rendered on a visual display of a computing device. The computer program product further comprises receiving, from the computing device, an indication of a compound consumer input associated with a consumer and performed using the consumer interface. The computer program product further includes, based on a determination that the compound consumer input corresponds to a purchase command, retrieving information previously stored for the consumer, generating an order to purchase the item for the consumer, and transmitting an order confirmation configured to be displayed by the computing device.

The computer program product further includes causing the consumer interface to display a consumer input definition interface including an indication of the purchase command; while the consumer input definition interface is displayed, the computer program product may include receiving input definition data defining a consumer interaction by the consumer; generating the compound consumer input based on the input definition data; associating the compound consumer input with the purchase command; and storing the association among the compound consumer input, the purchase command and the consumer on a non-transitory storage device.

In some embodiments, the computer program product may include causing the consumer interface to display a second consumer input definition interface including an indication of a second command; while the second consumer input definition interface is displayed, receiving second input definition data defining a second consumer interaction by the consumer; generating a second compound consumer input based on the second input definition data; associating the second compound consumer input with the second command; and storing the association among the second compound consumer input, the second command and the consumer on a non-transitory storage device. Receipt of the compound consumer input from the consumer interface of the consumer may initiate the purchase command for the consumer, and receipt of the second compound consumer input from the consumer interface of the consumer may initiate the second command for the consumer.

Some embodiments of the computer program product may include transmitting computer-executable instructions to cause a second consumer input definition interface to be displayed on a second consumer interface rendered on a second visual display of a second computing device associated with a second consumer; causing the second consumer interface to display a second consumer input definition interface including an indication of the purchase command; while the second consumer input definition interface is displayed, receiving second input definition data defining a second consumer interaction by the consumer; generating a second compound consumer input based on the second input definition data; associating the second compound consumer input with the purchase command; and storing the association among the second compound consumer input, the purchase command and the second consumer on a non-transitory storage device. Receipt of the compound consumer input from the consumer interface of the consumer may initiate the purchase command for the consumer, and wherein receipt of the second compound consumer input from the second consumer interface of the second consumer may initiate the purchase command for the second consumer.

The compound consumer input may include one or more of: a checkmark selection, a multi-point touchscreen press action, a mouse click action, a touchscreen tap action, a touchscreen press and hold action, a touchscreen drag and drop action, a touchscreen pinch action, a touchscreen unpinch action, a touchscreen swipe action, a touchscreen slide action, a touchscreen press action, a touchscreen pull-down action, a device shake action, a device twist action, a movement of the computing device, a change in orientation of the computing device, a touchscreen writing action, a touchscreen drawing or writing motion, a touchscreen selection of one or more alphanumeric characters, a keyboard action, a mouse action, a static or moving gesture captured by a camera, or a speaking of a sound.

In some embodiments, the purchase command may initiate purchase of the item without associating the item with an electronic shopping cart. The consumer interface may include a representation of an electronic shopping cart or a representation of a purchase drop region, and the purchase command may be initiated upon the compound consumer input overlapping with the representation of the shopping cart representation or the representation of the purchase drop region.

The compound consumer input may be a continuous touch interaction using a touchscreen, defined by: a first point at a first time; a second point at a second time subsequent to the first time; and a third point at a third time subsequent to the second time. In such an embodiment, the first, second and third points may not be collinear. In some embodiments, the compound consumer input is a continuous touch interaction using a touchscreen, defined by a point held for at least a predefined amount of time. The continuous touch interaction may be further defined by at least a second point at a second time subsequent to the predefined amount of time. Some embodiments of the the compound consumer input include a continuous touch interaction using a touchscreen, defined by: a first point at a first time; and a second point at a second time subsequent to the first time. The first point and the second point may define a predetermined first direction from the first point to the second point.

In some embodiments a first portion of the consumer input may be associated with the purchase command, and wherein a second portion of the consumer input may be associated with a second command. The computer program product may further include transmitting computer-executable instructions to alter the consumer interface in response to receiving an indication of the second command.

The second command may include a request command, and the computer program product may further include, in response to receiving an indication of the second command, transmitting computer-executable instructions to cause a second representation for a second item to be rendered on the consumer interface. In some embodiments, the second command may include a cancel purchase command, and wherein the computer program product may further include, in response to receiving an indication of the second command, transmitting computer-executable instructions to cause cancellation of a purchase of the item. The second command may include a quantity command defining a number of instances of the item selected for purchase, and the computer program product may further include, in response to receiving an indication of the second command, transmitting computer-executable instructions to cause facilitating purchase of one or more instances of the item based on the quantity command. Some embodiments of the second command include a relevance indicator command, and the computer program product may further include, in response to receiving an indication of the second command, transmitting computer-executable instructions to cause: determining one or more parameters of the item; associating or dissociating the one or more parameters with a consumer account as being relevant to the consumer account; and determining a second item different from the purchased item based on the one or more parameters.

Some embodiments of the computer program product may further comprise associating a third consumer input with a third command; receiving third consumer input data indicating a third consumer interaction with the representation of the item; and in response to receiving the third consumer input: determining whether the third command has been initiated based on the third consumer input, and processing the third command when the third command has been initiated. The second command may include a details command requesting details of the item, and the third command may additionally or alternatively include a cancel purchase command requesting cancelation of purchase of the item.

The computer program product may include determining a location of the computing device; determining a language associated with the location; and associating the compound consumer input with the purchase command based at least in part on the language.

In some embodiments, consumer input includes a plurality of discontinuous interactions at substantially a single location on the surface of a touchscreen. In some embodiments, an interaction comprises a continuous touch interaction defined by, on the surface of the touchscreen: a first point at a first time within the interaction region; a second point a second time at a purchase drop region of the consumer interface, wherein the second time is subsequent to the first point; and a discontinuation of the continuous touch interaction subsequent to the second time.

Embodiments of the computer program product may include, in response to determining that the purchase command has been initiated, facilitating the transaction without requesting a subsequent purchase confirmation.

Some embodiments of the computer program product may include, prior to receiving the compound consumer input, sending a request to the computing device for approval of facilitating the transaction without requesting subsequent purchase confirmation; receiving payment data from the computing device; storing the payment data; and subsequent to receiving consumer approval data indicating approval of facilitating the transaction without requesting the subsequent purchase confirmation, facilitating the transaction with the payment data.

The consumer interface may display a geographical map of a plurality of locations at which the item may be purchased, and a location of the consumer input on the map may correspond to a geographical location for which the item is purchased.

In some embodiments, the item may be a promotion, the representation of the item may be an impression, and the purchase command may be a command for initiating purchase of the promotion for the consumer.

In some embodiments, the computing device may be a mobile computing device, and the consumer interface may be rendered by a promotion application program executing on the mobile computing device. The consumer interface may additionally or alternatively be rendered by an email application program. The consumer interface may additionally or alternatively be rendered by a mobile push notification protocol.

In some embodiments, the purchase command may be predetermined to be associated with the compound consumer input.

The computer program product may include detecting a speed of the compound consumer input on the consumer interface. In such embodiments, the order may be generated based on a determination that the speed of the compound consumer input satisfies a predetermined threshold speed.

Some embodiments of the computer program product may further include detecting a speed of the compound consumer input on the consumer interface; and upon determining that the speed does not satisfy a predetermined speed threshold, displaying a purchase confirmation interface configured to enable user input for confirming or rejecting the purchase command. The order may be generated if user input confirming the purchase command is received at the purchase confirmation interface.

In some embodiments, the computer program product may include detecting a distance on the consumer interface covered by the compound consumer input. The order may be generated based on a determination that the distance on the consumer interface covered by the compound consumer input satisfies a predetermined threshold distance.

Embodiments of the computer program product may further include detecting a distance on the consumer interface covered by the compound consumer input; and upon determining that the distance does not satisfy a predetermined distance threshold, displaying a purchase confirmation interface configured to enable user input for confirming or rejecting the purchase command. The order may be generated if user input confirming the purchase command is received at the purchase confirmation interface.

The computer program product may include detecting a time period during which the compound consumer input is provided at the consumer interface, and the order may be generated based on a determination that the time period satisfies a predetermined threshold time period.

Some embodiments of the computer program product may include detecting a time period during which the compound consumer input is provided at the consumer interface; and upon determining that the time period does not satisfy a predetermined time threshold, displaying a purchase confirmation interface configured to enable user input for confirming or rejecting the purchase command. The order may be generated if user input confirming the purchase command is received at the purchase confirmation interface.

The computer program product may further include displaying a consumer interaction region on the consumer interface. The compound consumer input may be a continuous slide action or a pull-down action performed on the consumer interaction region.

In some embodiments, the computer program product may further include displaying a consumer instruction on the compound consumer input at the consumer interaction region. Additionally or alternatively, the computer program product may include displaying an indicator to indicate a progress of the compound consumer input as it is provided on the consumer interface.

The computer program product may further include, based on a determination that the compound consumer input corresponds to a purchase confirmation command, displaying a purchase confirmation interface on the consumer interface.

BRIEF DESCRIPTION OF THE DRAWINGS

The foregoing and other objects, aspects, features and advantages of exemplary embodiments will become more apparent and may be better understood by referring to the following description taken in conjunction with the accompanying drawings.

Figure 1:
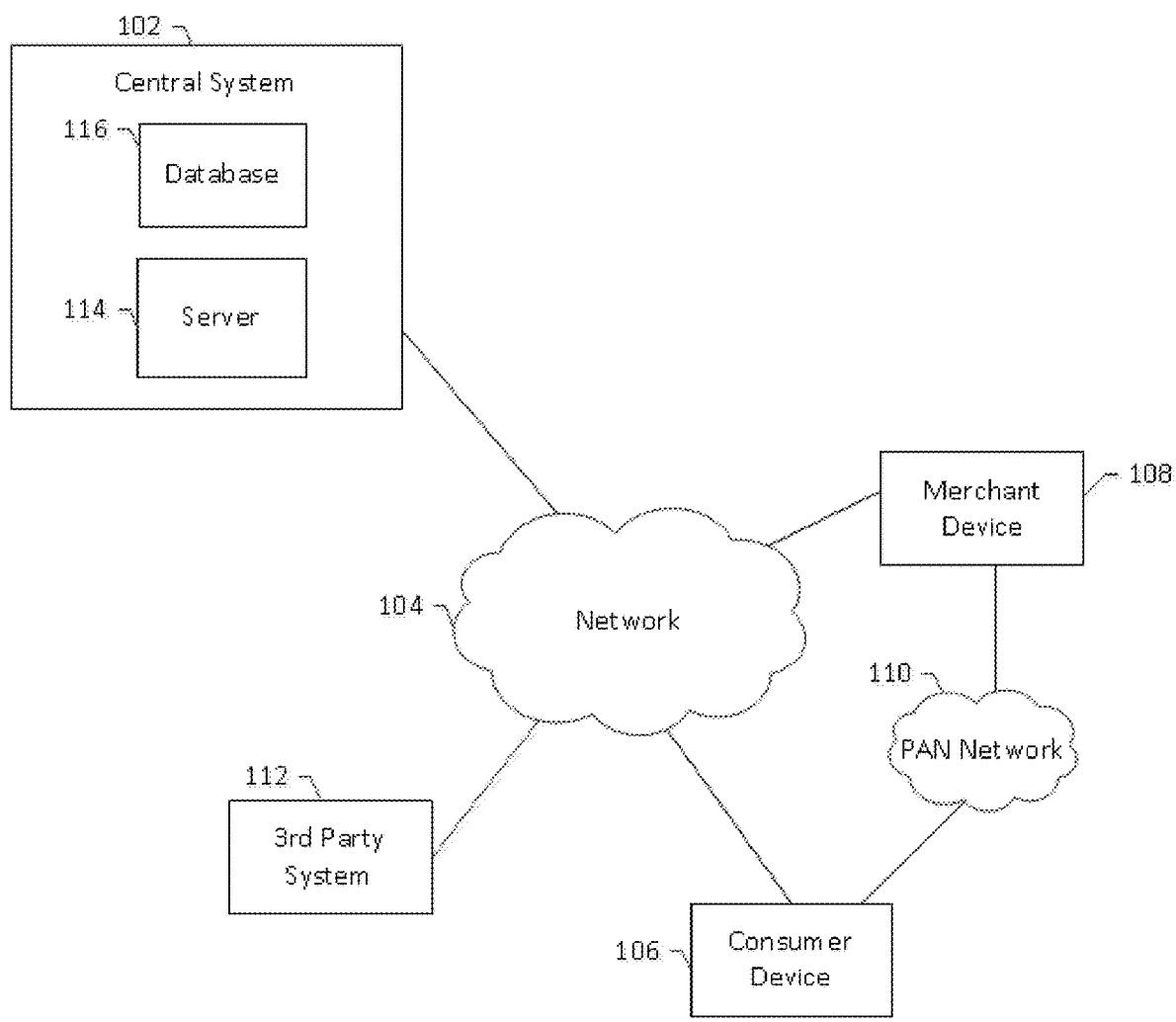
FIG. 1 shows an example of a system in accordance with some embodiments.

The accompanying drawings are not intended to be drawn to scale.

DETAILED DESCRIPTION

Various embodiments of the present invention are directed to providing an improved consumer interface, and associated system, that is configured to facilitate item transactions in an efficient, novel, and consumer friendly manner. Traditional interfaces suffer from being overly complicated and requiring excess hardware and/or screen space to facilitate the device functions. For example, a traditional interface may require a user to key in (e.g., via a physical or on-screen keyboard) purchase information or require a user to visit many layers of menus to complete each interaction. In such traditional interfaces, the interface and device may not perform optimally because of limitations on screen size, hardware interoperability, and processing power. Exemplary consumer interfaces according to embodiments of the present invention enable consumers to provide compound consumer inputs (e.g., swipes, slides, gestures, etc.) that initiate execution of a command associated with an item transaction or information request. To this end, exemplary embodiments store, on non-transitory computer-readable media or storage, associations between one or more commands and corresponding compound consumer inputs that, when entered by a consumer at a consumer interface, initiate the commands. These associations may improve the efficiency and functionality of the interface by allowing commands to be intuitively input without requiring additional hardware or software input devices (e.g., a third-party keyboard) or overly complex layers of on-screen menus.

In some embodiments, an association between a command and a consumer input may be consumer-defined, i.e., a consumer may be enabled to specify a consumer input that will initiate a command. In other embodiments, an association between a command and a consumer input may also be predefined, i.e., an application program providing exemplary functionality may have a predefined consumer input associated with a command. Exemplary embodiments detect a consumer interaction with the consumer interface, automatically determine if the consumer interaction corresponds exactly or approximately to a predefined consumer input and, if so, initiate the command associated with the consumer input.

The predefined or consumer-defined association between a particular consumer input and a particular command enable a consumer to initiate the command in fast and efficient manner without having to invoke conventional methods that may require a more extensive series of inputs (e.g., clicks) or, in some cases, the use of a more complex and less intuitive consumer interface. Additionally, the consumer specification of the consumer input, in certain embodiments, ensures that accidentally or inadvertently entered inputs are not interpreted as command initiating consumer inputs.

In certain embodiments, compound consumer inputs may be provided to initiate commands involving promotions provided by a promotion and marketing service. However, the use of exemplary compound consumer inputs to initiate commands is not limited to transactions involving promotions provided by a promotion and marketing service. In other embodiments, compound consumer inputs may be provided to initiate commands involving transactions regarding any items that may or may not be promotions.

In certain embodiments, for a purchase transaction, an electronic shopping cart is not associated with the item to be purchased and the purchase command does not require the consumer to use an electronic shopping cart. For example, a consumer may simply use a compound consumer input, e.g., a swipe or a slide, to buy an item without cycling through an electronic shopping cart.

In some embodiments, a purchase confirmation step is not required from the consumer prior to initiating the purchase command. In certain conventional consumer interfaces, a purchase confirmation step is required from a consumer in which the consumer reviews and confirms the purchase information embedded in the purchase command (e.g., shopping cart check-out process, etc.). In these embodiments, skipping the electronic shopping cart in the consumer interface interaction enables the transaction to proceed with the fewest number of steps (or interface screens) required by the consumer, thereby ensuring a fast and efficient purchase process. In certain embodiments, payment information associated with the consumer (e.g., credit card information) may be stored, and the consumer may not be required to enter this information during initiation of the purchase command, thereby increasing the speed and efficiency with which the system carries out the transaction.

Certain exemplary embodiments enable a consumer to associate different consumer inputs (consumer-defined and/or predefined) with different commands. Certain exemplary embodiments enable an application program to predefine a particular set of interactions that, when entered by a consumer using a consumer interface, initiate one or more commands. For example, the application program may predefine a first consumer input or interaction for initiating a first command (e.g., drawing the letter "f" over a representation of an item to share the item on Facebook), and a second different consumer input or interaction for initiating a second command (e.g., drawing the letter "t" over a representation of an item to share the item on Twitter).

A command may alter any aspect of the operation or function of the computing device (e.g., activate or shut down an application program or the computing device itself), or may initiate an action taken to facilitate a transaction (e.g., a commercial transaction such as purchasing a promotion offered by a promotion and marketing service).

Techniques for electronic or online retail are conventionally optimized for desktop computers. A common purchase flow places the user within a desktop optimized purchase funnel that requires a user to add an item to a shopping cart, proceed to a second interface for checkout and payment information submission, then to a purchase confirmation interface for user confirmation, and finally a receipt or purchase summary interface to notify the user that the purchase has been completed. Such purchase flows, as well as associated interfaces and the inputs capable of interacting with the interfaces, are optimized for desktop computers (e.g., using a mouse and keyboard) and are often burdensome, unintuitive, complicated, and time-consuming when used on a mobile device. Accordingly, techniques discussed herein may provide for streamlined, intuitive, and easy to use consumer interfaces and consumer input gestures that are optimized for mobile devices (e.g., smartphones, tablet computers, etc.).

Some embodiments may include a consumer device configured to perform some or all of the functionality discussed herein. Some embodiments may include one or more methods while other embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

Definitions of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example provider may be a running company that sells attire and other items for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "consumer interface" may include any digitally rendered user interface displayed on a visual display device for enabling a consumer to interface with a promotion and marketing service and/or a provider. An exemplary consumer interface may enable a consumer to view one or more promotions, purchase one or more promotions, share one or more promotions with other consumers, receive messages and/or promotions from other consumers, receive messages from the promotion and marketing service, receive messages from one or more providers, and the like. Exemplary consumer interfaces may be rendered in any desired form including, but not limited to, as a mobile application for display on a mobile computing device (e.g., a smartphone, table computer, etc.), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "impression" may include a communication, a display, or other perceived indication, such as a flyer, print media, e-mail, text message, application alert, mobile application, mobile notification, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by the impression.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "compound consumer input" encompasses all types of consumer input excluding a single simple click or a single touchscreen press action. Compound consumer input may include, without limitation, one or more of: a multi-point touchscreen press action, multiple touchscreen press or tap actions in sequence, a touchscreen press and hold action for a minimum threshold time duration (e.g., 2, 3, 4, 5, 6, 7, 8, 9, 10, 11, 12, 13 seconds), a touchscreen hold and drag action, a touchscreen drag and drop action, a touchscreen pinch action, a touchscreen unpinch action, a touchscreen swipe or slide action (e.g., left-to-right, right-to-left, up-to-down, down-to-up, diagonal or any other direction), a multi-point touchscreen swipe or slide action (e.g., to create a checkmark, letter, or other finger drawn character), a screen pull-down action, a device shake action, a device twist action, a movement of the computing device, a change in orientation of the computing device, a touchscreen writing action, a touchscreen drawing or writing motion, a touchscreen selection or tracing of one or more alphanumeric characters, a static or moving gesture captured by a camera, or an audible (e.g., speaking, etc.) of a sound captured by a voice recorder.

An exemplary compound consumer input for initiating a purchase command may, in one embodiment, be a combination of a touchscreen hold action for selecting a representation of an item combined with a touchscreen entry of a checkmark. Another exemplary compound consumer input for initiating a purchase command may be a combination of a touchscreen hold action for selecting a representation of an item combined with a touchscreen entry of a checkmark. Another exemplary compound consumer input for confirming a purchase command may be a long press action combined with a voice command (e.g., answering the question "do you really want to buy this?"). Another exemplary compound consumer input for initiating a command to display more items may be a long press and hold action. Another exemplary compound consumer input for initiating an item information request command may be a double tapping action. Another exemplary compound consumer input for initiating a purchase command without requiring details on the item may be a swipe or slide action. Another exemplary compound consumer input for initiating a command to share an item on Facebook may be a user-drawn letter "f" using a touchscreen. Another exemplary compound consumer input for initiating a command to share an item on Twitter may be a user-drawn letter "t" using a touchscreen. Another exemplary compound consumer input for initiating a command to share an item using email may be a user-drawn letter "e" using a touchscreen.

As used herein, the term "command" encompasses a set of computer-executable instructions for initiating a change in an operation or function of a computing device and/or for facilitating a transaction. Exemplary commands for facilitating a transaction may include, but are not limited to, one or more commands to purchase an item, add an item to a shopping cart or a wish list, request additional information on an item, hold an item for later purchase, save an item or information on an item, add an item to a favorite list, share an item with another consumer over social networking websites or mobile applications, email an item to another consumer, rate an item, indicate a relevance of an item to a consumer, undo a previous action related to an item, compare an item to one or more additional items, display a map of locations where an item is available, seek help or assistance on an item or purchase of an item, research and/or compare items, and the like.

As used herein, the term "module," encompasses hardware, software and/or firmware configured to perform one or more particular functions.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

Some embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Exemplary System Architecture

FIG. 1 shows an example system 100 in accordance with some embodiments. System 100 may include promotion and marketing system 102 (or "system 102"), network 104, consumer device 106, provider device 108, personal area network (PAN) 110, and third party system 112. System 102 may be communicably connected with consumer device 106 and provider device 108 via network 104. System 102 may include server 114 and database 116.

Server 114 may include circuitry, networked processors, or the like configured to perform some or all of the server-based processes described herein and may be any suitable network server and/or other type of processing device. In some embodiments, system 102 may function as a "cloud" with respect to the consumer device 106 and/or provider device 108. In that sense, server 114 may include several servers performing interconnected and/or distributed functions. To avoid unnecessarily overcomplicating the disclosure, server 114 is shown and described herein as a single server.

Database 116 may be any suitable network storage device configured to store some or all of the information described herein. For example, database 116 may be configured to store consumer information, provider information, promotion information, and/or among other things. As such, database 116 may include, for example, one or more database systems, backend data servers, network databases, cloud storage devices, etc. To avoid unnecessarily overcomplicating the disclosure, database 116 is shown and described herein as a single database.

In some embodiments, system 102 may be configured to provide a promotion and marketing service to consumer device 106. A promotion and marketing service, as used herein, may include a service that is accessible via one or more computing devices (e.g., consumer device 106) and may be operable to provide example promotion and/or marketing services on behalf of one or more providers that are offering one or more instruments that are redeemable for goods, services, experiences and/or the like. The promotion and marketing service may be further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like.

In some embodiments, consumer device 106 may be configured to generate and/or provide a consumer interface to a display of the consumer device. The consumer interface may be configured to receive consumer input data for viewing, searching, and/or otherwise interacting with an impression including one or more promotions and/or one or more items. The consumer input data may be generated via one or more input devices including, without limitation, a touchscreen, a microphone, a camera, and/or a motion sensor device (e.g., an accelerometer, gyroscope, etc.). As discussed in greater detail below, various types of predefined consumer input data, referred to herein as "compound consumer inputs," may be associated with various commands that allow the consumer to interact with the system 102 and/or the promotional and marketing service.

Provider device 108 may be associated with a provider, and may be located at a provider shop (e.g., a merchant or retail shop, restaurant, or the like) and/or other location. Although a single provider device 108 is shown, system 100 may include any number of provider devices that may be associated with various other providers. In some embodiments, provider device 108 may be configured to provide point-of-sale (POS) functionality for the provider, such as at the provider's shop. Furthermore, provider device 108 may be a stationary and/or mobile device.

In some embodiments, system 102 may be configured to receive promotion data from provider device 108 indicating a promotion for goods, experiences and/or services (or "items" as used herein) and/or one or more promotion parameters of the promotion (e.g., target audience, timing, accepted value, promotional value, residual value, etc.). System 102 may then generate and/or provide one or more impressions for the promotion to consumer device 106, which may be redeemed with the provider via provider device 108, such as in connection with a transaction.

In some embodiments, system 100 may further include one or more third party systems 112, among other things. For example, third party system 112 may include a payment server configured to provide for the exchange of money, credits, etc., between the provider and consumer. In some embodiments, third party system 112 may alternatively or additionally include an online social network including users that may be associated with each other (e.g., as friends, contacts, acquaintances, etc.).

Figure 2:
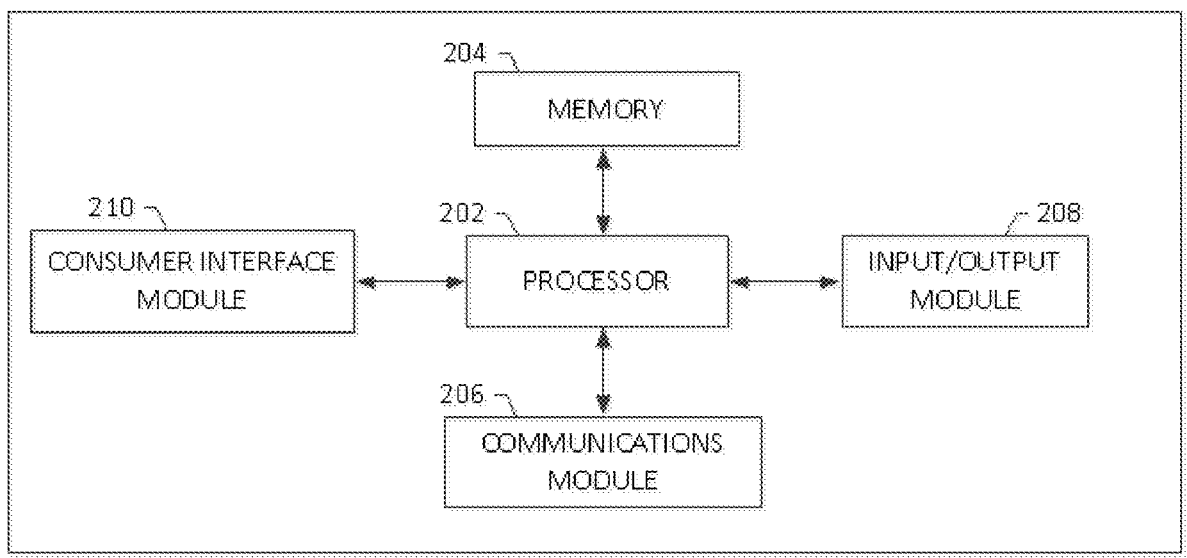
FIG. 2 shows a schematic block diagram of an example of circuitry configured in accordance with some embodiments.

FIG. 2 shows a schematic block diagram of example circuitry 200, some or all of which may be included in system 102, server 114, database 116, consumer device 106, and/or provider device 108. In accordance with some example embodiments, circuitry 200 may include various means, such as one or more processors 202, memories 204, communications modules 206, and/or input/output modules 208.

In some embodiments, such as when circuitry 200 is included in server 114 or consumer device 106, consumer interface module 210 may also or instead be included. For example, where consumer interface module 210 is included with consumer device 106, the module may be configured to facilitate the functionality discussed herein regarding generating consumer input data for a consumer interface. In another example, where consumer interface module 210 is included with server 112, the module may be configured to receive the consumer input data and to process the consumer input data.

The means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments discussed herein while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol.

Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, consumer interface module 210 may also or instead be included and configured to perform the functionality discussed herein related providing a consumer interface. In some embodiments, some or all of the functionality of consumer interface module 210 may be performed by processor 202. In this regard, some or all of the example processes and algorithms discussed herein can be performed by at least one processor 202 and/or consumer interface module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

User Definition of Compound Consumer Inputs for Initiating Commands

Certain exemplary embodiments enable a consumer, and/or the system, to define a particular set of interactions that, when entered by the consumer using a consumer interface, initiate a particular command. The consumer may also be allowed to associate different compound consumer inputs with different commands. A command may alter any aspect of the operation or function of the computing device (e.g., activate or shut down an application program or the computing device itself), or may initiate an action taken to facilitate a transaction (e.g., a commercial transaction such as purchasing a promotion offered by a promotion and marketing service). For example, a consumer may predefine a first compound consumer input for initiating a first command (e.g., that drawing the letter "f" over a touchscreen representation of an item may initiate a command for sharing the item on Facebook), and a second compound consumer input for initiating a second command (e.g., that drawing the letter "t" over a touchscreen representation of an item may initiate a command for sharing the item on Twitter), and the like. Providing a user-defined suite of compound consumer inputs in an application program enables a consumer to initiate commands in a fast and efficient manner as the user-specified inputs act as shortcuts for the commands. The user definition of the compound consumer inputs is also advantageous as they are customized for consumers and are therefore intuitive and easy to remember.

Figure 3A:
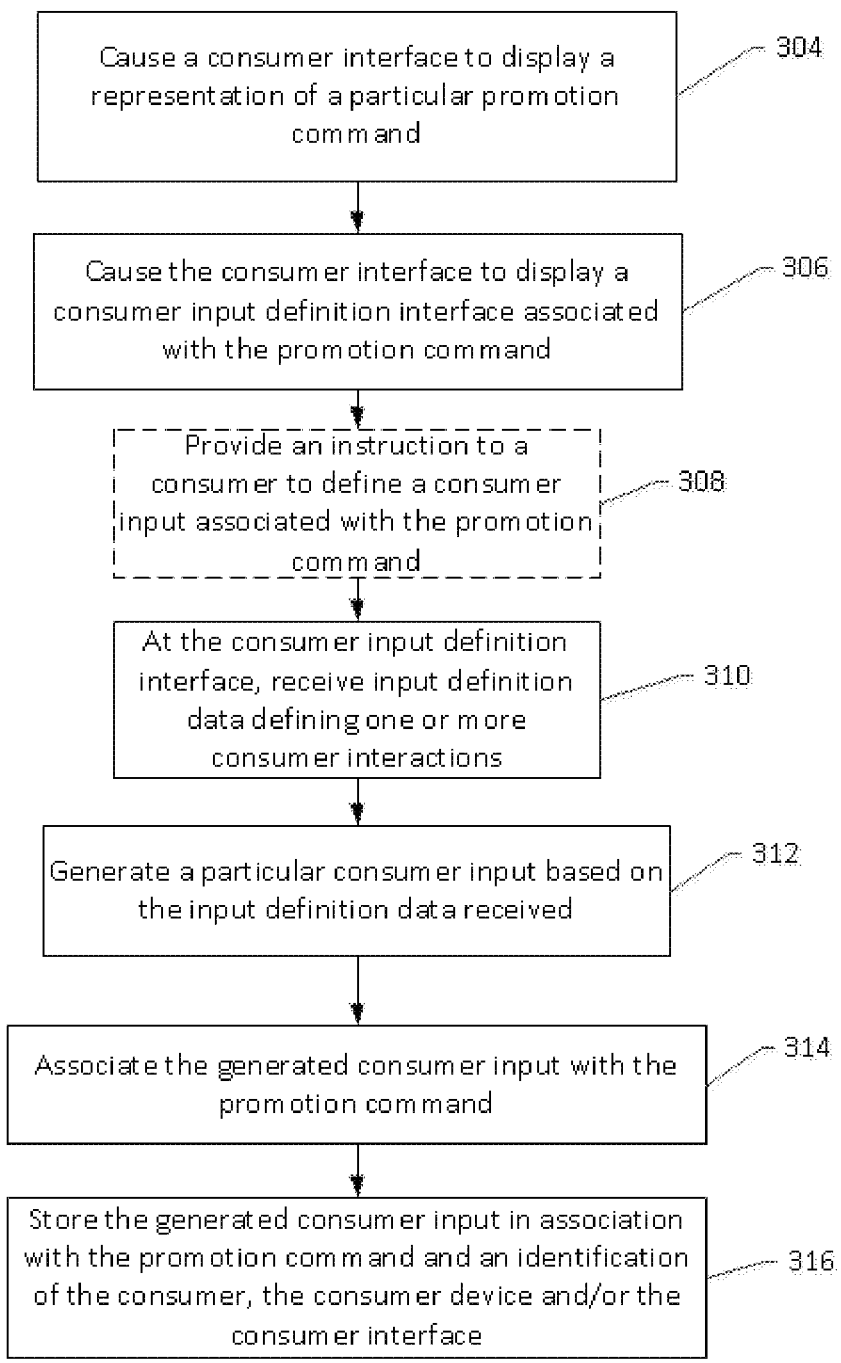
FIG. 3A shows an example method of enabling a consumer to define a consumer input for a particular command.

FIG. 3A is a flowchart illustrating a computer-executable method 300 for enabling a consumer to define predefined or consumer-defined consumer input that, when entered by the consumer on a consumer interface, will initiate a particular command. In step 304, computer-executable instructions may be executed to cause the consumer interface to display a representation of a particular command, e.g., a command associated with a promotion, such as purchasing a promotion. The representation of the command may be a text, pictorial, graphic or audio indication or description of the command. In certain embodiments, the instructions executed may be provided in or by a promotion application program.

In step 306, computer-executable instructions may be executed to cause the consumer interface to display a consumer input definition interface associated with the command. The input definition interface may include an indication of one or more (e.g., all) commands that the consumer device is configured to process. Additionally or alternatively, the input definition interface may allow the consumer to generate consumer-defined commands that may be different from predefined commands and/or may include bundles of two or more predefined commands (e.g., to further streamline the consumer interface). Advantageously, there is less concern that the consumer has inadvertently or, without authorization, provided consumer input associated with a command when the command and/or consumer input are consumer-defined. Furthermore, various consumers may find certain types of consumer inputs easier to replicate, remember, use, etc.

In some embodiments, the consumer input definition interface may include, but is not limited to, one or more of: a full touchscreen (for capturing touch gestures entered by the consumer on the consumer interface), a portion of a touchscreen (for capturing touch gestures entered by the consumer on the consumer interface), a photo camera (for capturing images of the consumer's body and/or physical gestures), a video camera (for capturing images of the consumer's body and/or physical gestures), an audio recorder (for capturing speech or sound generated by the consumer), a keyboard (for capturing alphanumeric characters entered by the consumer), a pointing device like a mouse (for capturing click actions performed by the consumer), and the like. In certain embodiments, the instructions executed may be provided in or by a promotion application program. In some embodiments, the consumer input definition interface may be provided as an onboarding and/or calibration step prior to providing the consumer interface to the computing device.

In step 308, in certain embodiments, an instruction may be provided to the consumer to instruct or train him/her in defining consumer input associated with the command. The instruction may include, but is not limited to, text instruction, graphic instruction, audio instruction, a demonstration, and the like. For example, a demonstration may visually render the tracing of a programmed and predetermined compound consumer input at the consumer input definition interface, and may instruct the consumer that the exemplary compound consumer input may be associated with a purchase command, e.g., a promotion purchase command.

Upon the consumer interacting with the consumer input definition interface, in step 310, corresponding input definition data defining the interactions may be received at the consumer input definition interface. In some embodiments, the consumer may be allowed to select a command, which may result in a window, prompt or input interface being displayed on the consumer device for receiving the input definition data associated with the selected command. The input definition data may correspond with any of the types of compound consumer input and/or compound consumer input data discussed herein, including touchscreen data, voice data, motion data, and/or image (and/or video) data. In that sense, the consumer device may be further configured to receive a selection of an input device, activate and/or otherwise connect the input device with the consumer input definition interface, and/or generate interfaces as suitable depending on the selected input device. In some embodiments, a command, compound consumer input definition data, compound consumer input data, and/or a compound consumer input may be associated with inputs from one or more different input devices.

In step 312, a particular compound consumer input may be generated automatically based on the input definition data received. For example, the compound consumer input may include an ordered and/or time-based set of inputs. In some embodiments, generating the compound consumer input may further include processing the input definition data, including noise filtering and/or other optimization algorithms. In some embodiments, the consumer input may be set to be the exact consumer interaction indicated by the input definition data, or an approximate version of the consumer interaction indicated by the input definition data. For example, if the input definition data indicates that the consumer wishes to use the letter "b" to indicate a purchase decision, then an approximate visual outline of the letter "b" may be set as the consumer input that corresponds to a purchase command. Said differently, the input definition data may configured the device to initiate a purchase in response to the consumer tracing the letter "b" proximate a promotion presented via the interface.

In step 314, the generated consumer input may be associated with the command. In step 316, the association generated may be stored in a non-transitory storage medium in association with the command specified and with an identification of the consumer, an identification of the consumer and/or an identification of the consumer interface.

The server and/or consumer device may be configured to receive second input definition data defining a second consumer interaction with the consumer device. In some embodiments, the server and/or consumer device may be configured to compare second input definition data with one or more existing compound consumer inputs. If the second input definition data matches, corresponds with, meets an algorithmic similarity test, and/or otherwise corresponds too closely with an existing compound consumer input, the user may be notified and allowed to provide different input definition data. Similarly, if the second input definition data is sufficiently unique from an existing compound consumer input, the second input definition data may be accepted. The server and/or consumer device may be configured to generate a second compound consumer input based on the second input definition data.

The method 300 may be repeated for the same consumer to enable the consumer to define consumer input for different commands. In one embodiment, the consumer interface may be configured to display a second consumer input definition interface including an indication of a second command. Second input definition data defining a second consumer interaction may be received from the second consumer input definition interface. In response, a second consumer input may be generated based on the second input definition data. The second consumer input may be associated with the second command for the consumer. The association among the second consumer input, the second command and the consumer may be stored on a non-transitory storage device. In this embodiment, a first command is automatically initiated upon receipt of a first consumer input corresponding to a first command from a consumer interface, while a second command is automatically initiated upon receipt of a second consumer input corresponding to a second command from the consumer interface.

The method 300 may be performed independently for different consumer interfaces displayed for different consumers so that consumers may customize the meaning of their input. For example, a first consumer may define the letter "b" (i.e., a letter "b" drawn by the user via a touchscreen) to mean a purchase command, while a second consumer may define the letter "b" to mean a favorite command and the letter "c" to mean a cancel purchase command.

In an exemplary embodiment, a second consumer input definition interface may be displayed on a second visual display of a second computing device associated with a second consumer. The second consumer input definition interface may include a second indication of a second command. Second input definition data defining a second consumer interaction may be received from the second consumer interface. A second consumer input may be generated based on the second input definition data, and associated with the second command and the second consumer.

Subsequently upon determining that a consumer input corresponds to the command, as associated in method 300, one or more actions may be taken to initiate the command, for example, by retrieving and transmitting information on an item on which the command is executed.

Figure 3B:
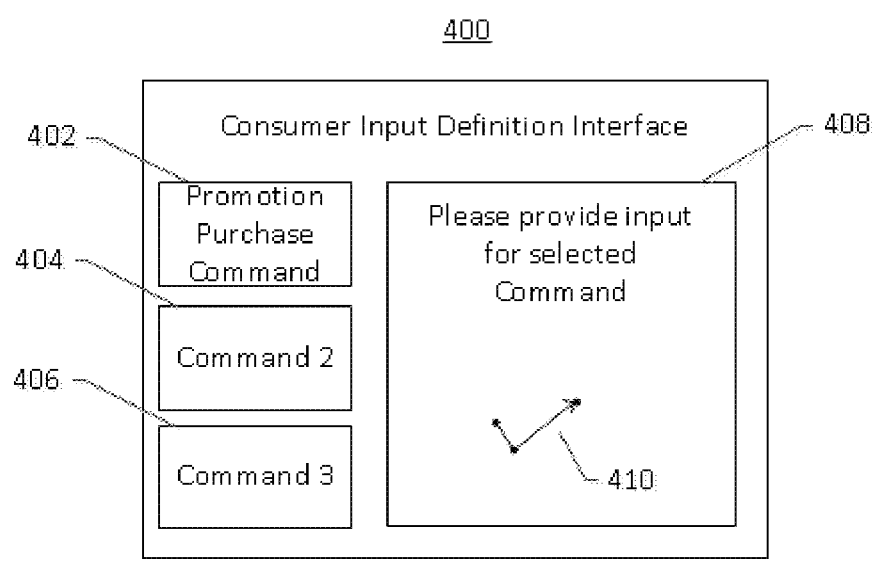
FIG. 3B illustrates an exemplary consumer input definition interface for use in the method of FIG. 3A.

FIG. 3B shows an example consumer input definition interface 400 in accordance with some embodiments, as shown in step 306 of FIG. 3A. Input definition interface 400 may include command indications 402, 404, and 406. In certain embodiments, as shown in step 308 of FIG. 3A, a consumer may be provided with instructions on using the consumer input definition interface 400 to define compound consumer input corresponding to the commands. In response to the consumer selecting a command indication, an input interface 408 may be displayed within the consumer input definition interface 400.

As shown in step 310 of FIG. 3A, the consumer may then provide a consumer input to define a compound consumer input in relation to a particular command so that input of the compound consumer input automatically initiates execution of the command. An exemplary compound consumer input may be provided as touchscreen interaction 410 within input interface 408. For example, the consumer may define a first compound consumer input or interaction for initiating a first command (e.g., drawing the letter "f" over a representation of an item to share the item on Facebook), and a second different compound consumer input or interaction for initiating a second command (e.g., drawing the letter "t" over a representation of an item to share the item on Twitter).

Exemplary compound consumer input may include, without limitation, one or more of: a multi-point touchscreen press action, multiple touchscreen press or tap actions in sequence, a touchscreen press and hold action for a minimum threshold time duration (e.g., 2, 3, 4, 5, 6, 7, 8, 9, 10, 11, 12, 13 seconds), a touchscreen hold and drag action, a touchscreen drag and drop action, a touchscreen pinch action, a touchscreen unpinch action, a touchscreen swipe or slide action (e.g., left-to-right, right-to-left, up-to-down, down-to-up, diagonal or any other direction), a multi-point touchscreen swipe or slide action (e.g., to create a checkmark, letter, or other finger drawn character), a screen pull-down action, a device shake action, a device twist action, a movement of the computing device, a change in orientation of the computing device, a touchscreen writing action, a touchscreen drawing or writing motion, a touchscreen selection or tracing of one or more alphanumeric characters, a static or moving gesture captured by a camera, or an audible (e.g., speaking, etc.) of a sound captured by a voice recorder.

As shown in steps 312 and 314 of FIG. 3A, the input definition data of the interaction entered by the consumer may be used to generate a particular compound consumer input that is associated with the particular command.

Exemplary consumer interfaces enable consumers to provide compound consumer inputs at a consumer interface that initiate execution of commands associated with the compound consumer inputs. To this end, exemplary embodiments store, on non-transitory computer-readable media or storage, associations between one or more commands and corresponding compound consumer inputs that, when entered by a consumer at a consumer interface, initiate the commands. An association between a command and a compound consumer input may be consumer-defined, i.e., a consumer may be enabled to specify a compound consumer input that will initiate a command. An association between a command and a consumer input may also be predefined, i.e., an application program providing exemplary functionality may have a predefined consumer input associated with a command. Exemplary embodiments detect a consumer interaction with the consumer interface, automatically determine if the consumer interaction corresponds exactly or approximately to a predefined compound consumer input and, if so, initiate the command associated with the consumer input.

The association between a particular compound consumer input and a particular command enable a consumer to initiate the command in a fast and efficient manner without having to invoke the command using a conventional method that may require more extensive inputs or, in some cases, the use of a more complex and less intuitive consumer interface. Additionally, the consumer specification of the compound consumer input as opposed to a simple click, in certain embodiments, ensures that accidentally or inadvertently entered input is not interpreted as a consumer input that should initiate a command.

In certain embodiments, compound consumer input may be provided to initiate commands involving promotions provided by a promotion and marketing service. However, the use of exemplary compound consumer inputs to initiate commands is not limited to transactions involving promotions provided by a promotion and marketing service. In other embodiments, compound consumer inputs may be provided to initiate commands involving transactions regarding any items that may or may not be promotions.

In certain embodiments, for a purchase transaction, an electronic shopping cart is not associated with the item to be purchased and the purchase command does not require the consumer to use an electronic shopping cart. In certain embodiments, a purchase confirmation is not required from the consumer prior to initiating the purchase command. In certain convention consumer interfaces, a purchase confirmation is required from a consumer in which the consumer reviews and confirms the purchase information embedded in the purchase command. In these embodiments, skipping the electronic shopping cart in the consumer interface interaction enables the transaction to proceed with the fewest number of steps required by the consumer, thereby ensuring a fast and efficient purchase process. In certain embodiments, payment information associated with the consumer (e.g., credit card information) may be stored, and the consumer may not be required to enter this information during initiation of the purchase command, thereby increasing the speed and efficiency of the transaction.

Predefined Compound Consumer Inputs for Initiating Commands

Certain exemplary embodiments enable an application program to predefine compound consumer inputs that, when entered by a consumer using a consumer interface, initiate execution of one or more commands. For example, the application program may predefine a first compound consumer input for initiating a first command (e.g., that drawing the letter "f" over a touchscreen representation of an item may initiate a command for sharing the item on Facebook), and a second compound consumer input for initiating a second command (e.g., that drawing the letter "t" over a touchscreen representation of an item may initiate a command for sharing the item on Twitter), and the like. Providing a predefined suite of compound consumer inputs in an application program enables a consumer to initiate commands in a fast and efficient manner as the predefined inputs act as shortcuts for the commands. The predefinition of the compound consumer inputs is also advantageous for consumers who wish to use these shortcuts without having the wish or ability to define them himself/herself.

An exemplary command, thus initiated, may alter any aspect of the operation or function of the computing device executing the application program (e.g., activate or shut down the application program or the computing device itself), or may initiate an action taken to facilitate a transaction (e.g., a commercial transaction such as purchase of a promotion offered by a promotion and marketing service).

In some embodiments, a predefined compound consumer input for initiating a command may not be overridden by a consumer.

In other embodiments, a consumer may be allowed to override a compound consumer input predefined for initiating a command, and to define a consumer-specific compound consumer input to initiate the command. In some embodiments, the consumer input definition interface may include, but is not limited to, one or more of: a full touchscreen (for capturing touch gestures entered by the consumer on the consumer interface), a portion of a touchscreen (for capturing touch gestures entered by the consumer on the consumer interface), a photo camera (for capturing images of the consumer's body and/or physical gestures), a video camera (for capturing images of the consumer's body and/or physical gestures), an audio recorder (for capturing speech or sound generated by the consumer), a keyboard (for capturing alphanumeric characters entered by the consumer), a pointing device like a mouse (for capturing click actions performed by the consumer), and the like. In some embodiments, the consumer input definition interface may be provided as an onboarding and/or calibration step prior to providing the consumer interface to the computing device.

In these embodiments, the consumer interface may provide a consumer input definition interface to enable a consumer to generate a consumer-defined compound consumer input that may be different from a predefined compound consumer input and/or may include bundles of two or more predefined compound consumer inputs (e.g., to further streamline the consumer interface). For example, for a predefined first association between a first compound consumer input and a first command, a consumer may define a second compound consumer input for the same first command. In this example, a second association may be generated between the second compound consumer input and the first command such that entry of the second compound consumer input initiates the first command. In some cases, the first association may be removed or deleted such that entry of the first compound consumer input no longer initiates the first command. In other cases, the first association and the second association may both remain valid so that entry of either the first or the second compound consumer input initiates the first command.

In some cases, a single compound consumer input formed by a plurality of compound consumer inputs may be defined to initiate a plurality of concurrent or sequential commands. In some cases, a first portion of the compound consumer input may initiate execution of a first command, and a second portion of the compound consumer input may initiate execution of a second command. For example, a left-to-right swipe or slide followed immediately by a right-to-left swipe or slide may be defined as a single compound consumer input and may correspond to, respectively, first and second commands.

Figure 4:
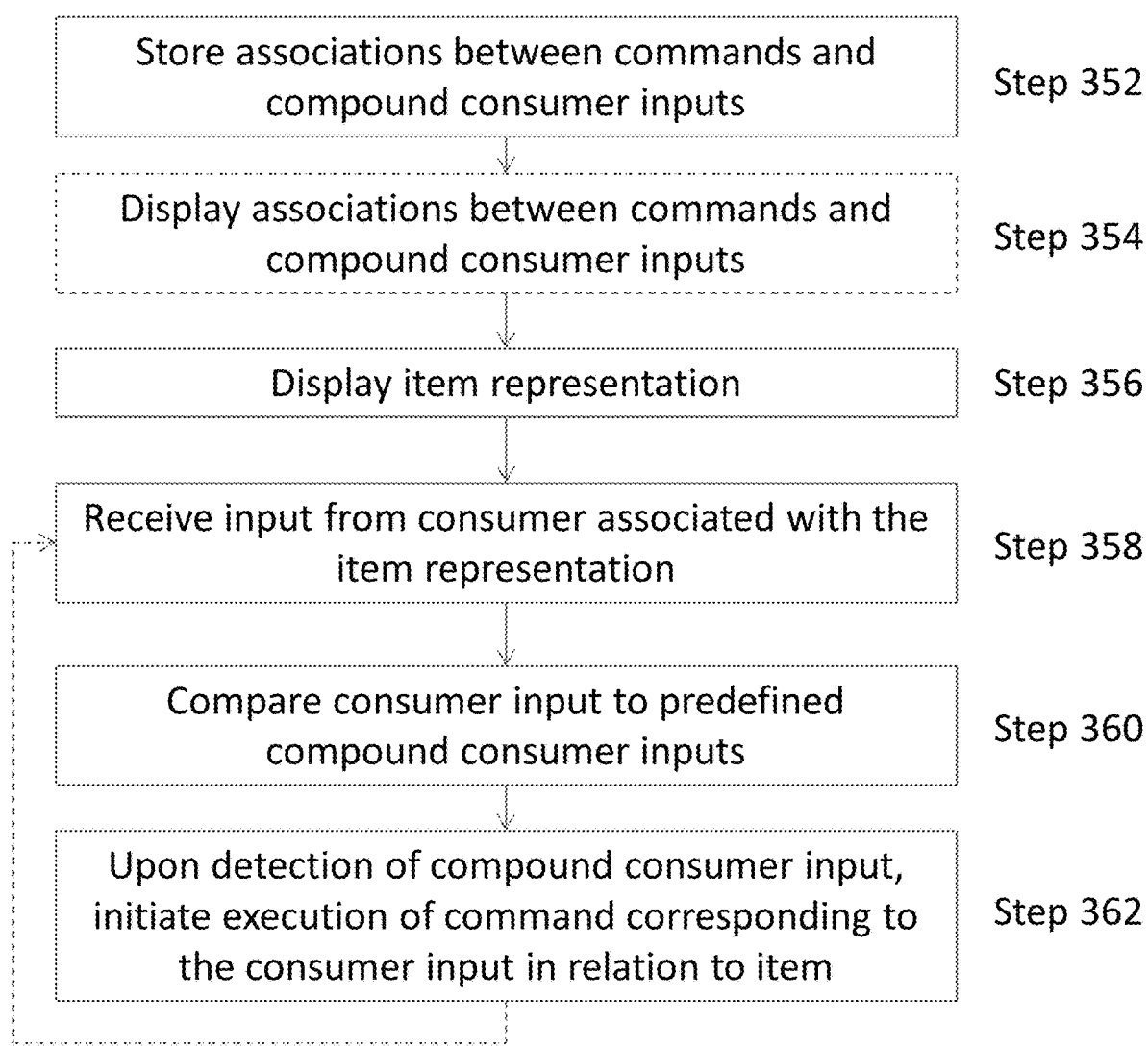
FIG. 4 shows an example method of providing predefined consumer input for initiating commands.

FIG. 4 is a flowchart illustrating a computer-executable method 350 for providing and using one or more predefined compound consumer inputs for initiating one or more commands using a consumer interface. In step 352, a non-transitory computer-readable medium may be used to store associations between one or more application program commands and one or more corresponding compound consumer inputs that, when entered on the consumer interface, initiate the commands. For example, a predefined first association may be provided between a first compound consumer input and a first command (e.g., that the compound consumer input defined by drawing the letter "f" on a touchscreen initiates a command for sharing an item on Facebook), such that receipt of the first compound consumer input at the consumer interface initiates the first command, and a predefined second association may be provided between a second compound consumer input and a second command (e.g., that the compound consumer input defined by drawing the letter "t" on a touchscreen initiates a command for sharing an item on Twitter), such that receipt of the second compound consumer input at the consumer interface initiates the second command.

An application program may have associated therewith and may access the associations stored on the non-transitory computer-readable medium in step 352 such that a consumer or user of the application program is readily provided with the associations without needing to define compound consumer inputs for initiating the commands.

In step 354, in certain embodiments, the application program may visually display the associations provided in step 352 such that a consumer or user of the application program is trained on the compound consumer inputs required to initiating particular commands. In one example, the application program may visually render an indication of each command and a corresponding static or moving visual representation of the compound consumer input required to initiate the command.

In step 356, during use of the application program, a representation of an item may be displayed on a consumer interface rendered on a visual display of a computing device in association with the application program. The representation of the item may be a text, pictorial, graphic or audio indication or description of the item. In some exemplary non-limiting embodiments, the item may be a product or service that may be purchased by the consumer using the consumer interface. In some exemplary non-limiting embodiments, the item may be a promotion provided by a promotion and marketing service, and the representation of the item may be an impression.

In step 358, the application program may detect that consumer input has been received at the consumer interface in association with the display of the representation of the item. For example, the application program may determine that consumer input has been entered within the dimension of a region of the consumer interface reserved for the item represented.

In step 360, the application program may analyze the consumer input and compare the consumer input to the predefined compound consumer inputs stored in step 352 in order to determine whether the received consumer input matches or approximates one of the predefined compound consumer inputs. In some embodiments, the application program may detect the shape, size, position on the consumer interface, sequence of positions on the consumer interface, movement across the consumer interface, and/or temporal nature of the consumer input and compare these features of the consumer input to corresponding features in the predefined compound consumer inputs. For example, two touches within the same general area of the consumer interface in quick succession may indicate that the consumer has entered a predefined "double tap" compound consumer input.

In step 362, upon detecting that the consumer input received at step 358 matches or approximates a first predefined compound consumer input, the application program may determine a corresponding first command based on the associations stored in step 352. The application program may subsequently automatically initiate execution of the first command in relation to the item represented. As one example, upon detection of a "double tap" compound consumer input, an association may be retrieved to determine that this compound consumer input is associated with an email action. In this case, the application program may send an email to the consumer including information on the item represented. As another example, upon detection of a compound consumer input of a user drawing the letter "f" using the consumer interface, an association may be retrieved to determine that this compound consumer input is associated with a Facebook share action. In this case, the application program may automatically share information on the item on Facebook with one or more of the consumer's Facebook acquaintances.

Subsequently, additional consumer input may be received at the consumer interface in relation to the item represented. Steps 358-362 may be repeated to determine if a second command should be automatically executed based on the received consumer input in relation to the item.

In certain embodiments, the consumer interface may display representations of more than one item and enable a consumer to use predefined compound consumer inputs in relation to the plurality of items. Additional consumer input may be received at the consumer interface in relation to the additional item represented. Steps 358-362 may be repeated to determine if additional commands should be automatically executed based on the received consumer input in relation to the additional item.

In some embodiments, a plurality of item representations may be displayed sequentially on the consumer interface so that the consumer may enter consumer input in relation to each item in a sequential manner. For example, a first display of the consumer interface may present a first item representation and a first touchscreen region configured to receive consumer input in relation to the first item, and a second display of the consumer interface may present a second item representation and the first touchscreen region configured to receive consumer input in relation to the second item. In some embodiments, the item representations may be displayed concurrently on the consumer interface. For example, the consumer interface may present a first item representation, a first touchscreen region configured to receive consumer input in relation to the first item, a second item representation and a second touchscreen region configured to receive consumer input in relation to the second item.

Exemplary Interactions with Consumer Interface

Exemplary consumer interfaces enable consumers to provide compound consumer inputs at a consumer interface that initiate execution of commands associated with the compound consumer inputs. To this end, exemplary embodiments store, on non-transitory computer-readable media or storage, associations between one or more commands and corresponding compound consumer inputs that, when entered by a consumer at a consumer interface, initiate the commands. An association between a command and a compound consumer input may be consumer-defined, i.e., a consumer may be enabled to specify a compound consumer input that will initiate a command. An association between a command and a consumer input may also be predefined, i.e., an application program providing exemplary functionality may have a predefined consumer input associated with a command. Exemplary embodiments detect a consumer interaction with the consumer interface, automatically determine if the consumer interaction corresponds exactly or approximately to a predefined compound consumer input and, if so, initiate the command associated with the consumer input.

The predefined or consumer-defined association between a particular consumer input and a particular command enable a consumer to initiate the command in a fast and efficient manner without having to invoke the command using a conventional method that may require more extensive inputs or, in some cases, the use of a more complex and less intuitive consumer interface. Additionally, the consumer specification of the compound consumer input as opposed to a simple click, in certain embodiments, ensures that accidentally or inadvertently entered input is not interpreted as a consumer input that should initiate a command.

In certain embodiments, compound consumer input may be provided to initiate commands involving promotions provided by a promotion and marketing service. However, the use of exemplary compound consumer inputs to initiate commands is not limited to transactions involving promotions provided by a promotion and marketing service. In other embodiments, compound consumer inputs may be provided to initiate commands involving transactions regarding any items that may or may not be promotions.

In certain embodiments, for a purchase transaction, an electronic shopping cart is not associated with the item to be purchased and the purchase command does not require the consumer to use an electronic shopping cart. In certain embodiments, a purchase confirmation is not required from the consumer prior to initiating the purchase command. In certain convention consumer interfaces, a purchase confirmation is required from a consumer in which the consumer reviews and confirms the purchase information embedded in the purchase command. In these embodiments, skipping the electronic shopping cart in the consumer interface interaction enables the transaction to proceed with the fewest number of steps required by the consumer, thereby ensuring a fast and efficient purchase process. In certain embodiments, payment information associated with the consumer (e.g., credit card information) may be stored, and the consumer may not be required to enter this information during initiation of the purchase command, thereby increasing the speed and efficiency of the transaction.

In certain other embodiments, a consumer interface may include a representation of an electronic shopping cart or a representation of a purchase drop region. In some cases, in order to initiate a purchase command, a consumer may provide or enter a compound consumer input such that part or all of the consumer input overlaps with the representation of the shopping cart or the representation of the purchase drop region.

Figure 5:
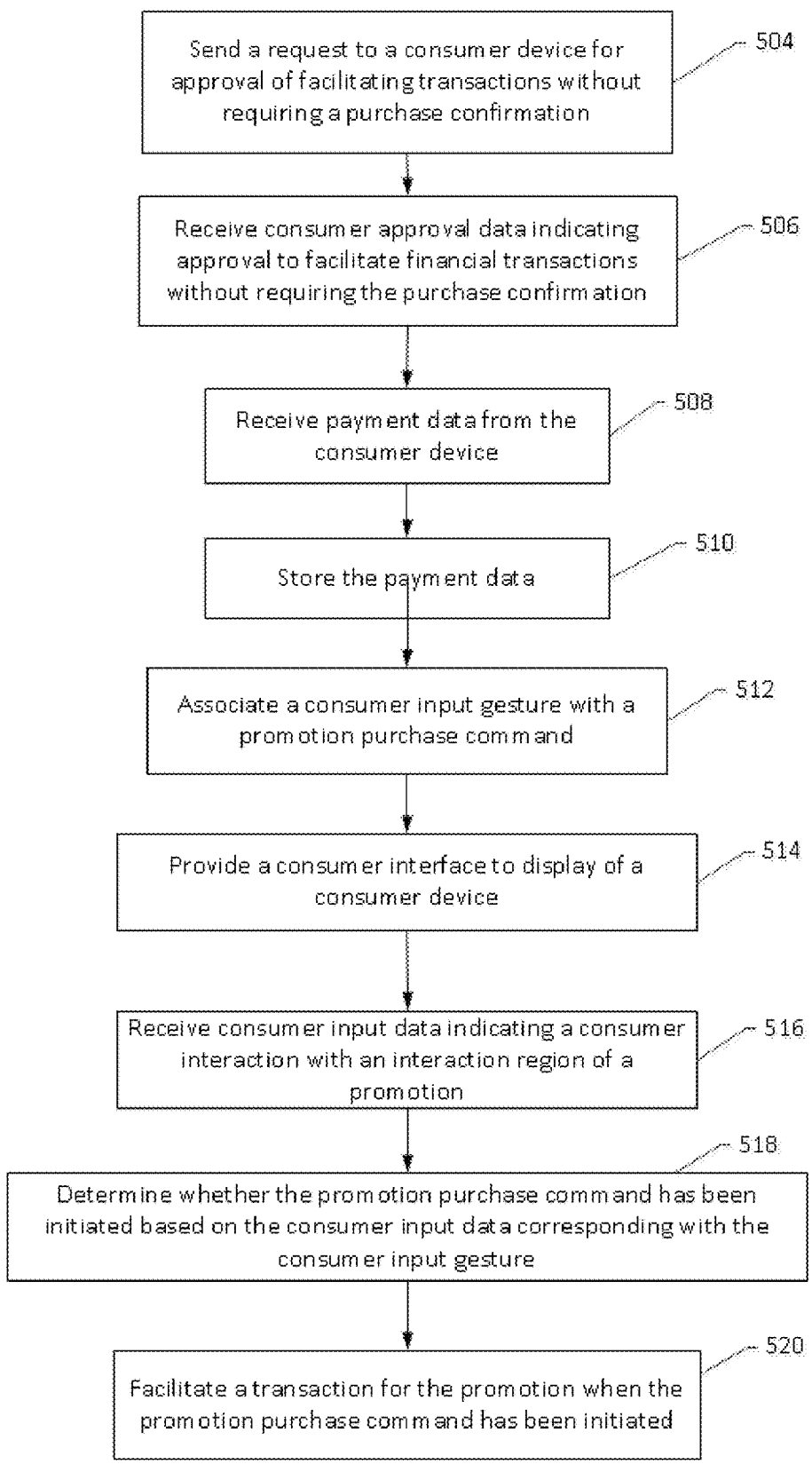
FIG. 5 shows an example method of facilitating a transaction for a promotion in accordance with some embodiments.

In one exemplary, non-limiting embodiment, a compound consumer input may be provided by a consumer to initiate a command associated with a transaction for a promotion provided by a promotion and marketing service. For example, a consumer may initiate purchase of a promotion using a touchscreen swipe or slide action on a consumer interface. FIG. 5 shows an example method 500 of facilitating a transaction for a promotion in accordance with some embodiments. Method 500, as well as the other methods herein, is discussed as being performed by a consumer device (e.g., consumer device 106), a provider device (e.g., provider device 108), and a server (e.g., server 114 of system 102 including database 116). However, in some embodiments, other suitable structures that can be suitably configured to perform method 500 can be used including circuitry, devices, apparatuses, networks, and/or among other things.

In step 504, a server (e.g., server 114 and/or other networked device) may be configured to send a request to a consumer device for approval of facilitating transactions without requiring a (e.g., subsequent or additional) request for a purchase confirmation (and/or receipt of a consumer response to such a subsequent or additional request) when applicable consumer input data has been received. For example, the transaction may include a financial transaction, commercial transaction, e-commerce transaction, electronic transaction, etc., and may be programmatically initiated based on one or more instances of compound consumer input generated by the consumer via one or more user input devices of the consumer device indicating a purchase command, e.g., a promotion purchase command.

At 506, the server may be configured to receive consumer approval data indicating approval to facilitate transactions without requiring the purchase confirmation after receiving consumer input data indicating the purchase command. For example, the consumer approval data may be generated by the consumer device and sent to the server in response to receiving the request at 504.

At 508, the server may be configured to receive payment data from the consumer device. For example, the payment data may include credit card data (e.g., card number, expiration date, card verification value), debit card data, financial account data, electronic payment account data, and/or any other data capable of being used by the server to facilitate the transaction.

At 510, the server may be configured to store the payment data. For example, the payment data may be stored in association with a consumer account of a consumer associated with the consumer device. In some embodiments, the payment data may be stored in a database (e.g., database 116) for subsequent use, such as in response to receiving consumer input data corresponding with a purchase command. In some embodiments, the payment data may be stored as one or more tokens, keys, codes, etc., for enhanced security. In some embodiments, the payment data may be stored in response to receiving the consumer approval data indicating the approval to facilitate transactions without requiring the purchase confirmation. In some embodiments, steps 504-510 may be performed as part of an initialization, onboarding, and/or calibration process that does not need to be repeated each time a promotion (or item) purchase command is initiated by the consumer.

At 512, in some embodiments, the server and/or consumer device may be configured to associate a compound consumer input with a purchase command, e.g., a promotion purchase command. The compound consumer input may be associated with a command that accesses a functionality provided by a promotion and marketing system (e.g., system 102), such as the purchase command. In some embodiments, the compound consumer input may be associated with a purchase command for purchase any item (e.g., product, service, experience, promotion, etc.) that may or may not be a promotion or a promotional item.

At 514, the server and/or consumer device may be configured to provide a consumer interface to a display of a consumer device. The consumer interface may include or display an impression indicating one or more promotions. In some embodiments, each of the one or more promotions may be associated with an interaction region of the consumer interface. Additionally or alternatively, the consumer device may be configured to generate the consumer interface and receive promotion data (e.g., indicating one or more promotion parameters, promotion details, etc.) and/or impression data (e.g., indicating characteristics of the impression), which may be provided to the consumer interface. In some embodiments, the consumer interface may include or display an impression indicating one or more items.

The consumer interface may be provided using various techniques and/or through a variety of communication channels. For example, the consumer interface may include: an email interface, a text message interface, a mobile application interface, a mobile push notification interface, a mobile touchscreen lock interface, a map display interface (e.g., including a map with impressions and/or references to impressions) shown based on geographic location of the provider, a home screen interface (e.g., of a mobile device operating system) and/or a mobile widget interface. For example, upon receiving an email or a push notification with an impression of a promotion, a consumer may provide a compound consumer input on the consumer interface associated with the impression. This will automatically result in a promotion application program processing the compound consumer input in the background to facilitate execution of a command associated with the compound consumer input.

At 516, the server and/or consumer device may be configured to receive data on a compound consumer input provided at an interaction region of a promotion of the one or more promotions. The compound consumer input may be provided by a consumer via an input device of the consumer device. In some embodiments, an interaction region of a promotion may include a graphical display and/or text display that indicates the promotion and/or its promotion parameters. In some embodiments, the interaction region may include a "buy button," among other things. In some embodiments, the server and/or consumer device may be configured to receive data on a compound consumer input provided by a consumer at an interaction region of an item of one or more items represented within a consumer interface.

At 518, in response to receiving the consumer input data, the server and/or consumer device may be configured to determine whether the promotion (or item) purchase command has been initiated based on the consumer input data corresponding with the compound consumer input. For example, the server may be configured to compare data on the compound consumer input with one or more compound consumer inputs (e.g., each associated with a different command) to determine a compound consumer input that matches, substantially matches, most closely matches, and/or otherwise corresponds with the received compound consumer input. In some embodiments, such as where the consumer device is configured to determine the purchase command and/or other command, the consumer device may be configured to provide the determined command to the server.

As discussed above, the consumer interface may be provided via a variety of different channels including an email interface, a mobile home screen interface, a text message interface, a map display interface, a mobile application interface, a mobile push notification interface, a mobile touchscreen lock interface, and a mobile widget interface. In some embodiments, the server may be configured to receive data on the compound consumer input and/or associated command via the same communication channel as the consumer interface and/or impression. In another example, the consumer device may be configured to provide data on the compound consumer input and/or associated command via a dedicated communication channel (e.g., regardless of the communication channel of the consumer interface). For example, where the consumer interface is part of an email interface, the consumer device may be configured to generate data on the compound consumer input and/or command, and may be further configured to provide the data to the server via a mobile application. In some embodiments, the mobile application may include the consumer interface and may be launched based on consumer selection of a reference within an impression provided via a different communication channel (e.g., email, text, etc.). In some embodiments, a mobile operating system may be configured to receive data on the compound consumer input from an input device, determine a command based on the data, and provide the data on the compound consumer input and/or command to the server. In that sense, the compound consumer inputs and/or consumer interactions may be used for virtually any communication channel, and may even be used for applications other than the mobile application including the consumer interface.

At 520, the server and/or consumer device may be configured to facilitate a transaction for the promotion when the purchase command has been initiated. In some embodiments, the server may be configured to facilitate the transaction using the payment data. For example, facilitating the transaction may include charging the consumer the accepted value of the promotion. The server may be configured to further provide an instrument for redemption of the promotion to the consumer device. In some embodiments, the server and/or consumer device may be configured to facilitate a transaction for an item when an item purchase command has been initiated.

Some embodiments may provide for a streamlined purchase experience. For example, the server may be configured to facilitate the transaction without associating the promotion with an electronic shopping cart. Here, the consumer interface may not be required to take the consumer to a checkout display for providing payment data, purchase confirmation, and/or the like. Instead, the payment data stored within the system may be used automatically, such as in response to a determination by the server that the consumer approval data has been previously received from the consumer device at 506. In some embodiments, the server may be configured to facilitate the transaction without requesting a subsequent purchase confirmation after determining that the purchase command has been initiated. For example, the consumer interface may be configured to provide a purchased summary and/or "thank you for the purchase" indicator without further consumer interaction subsequent to initiating the purchase command.

Figure 6:
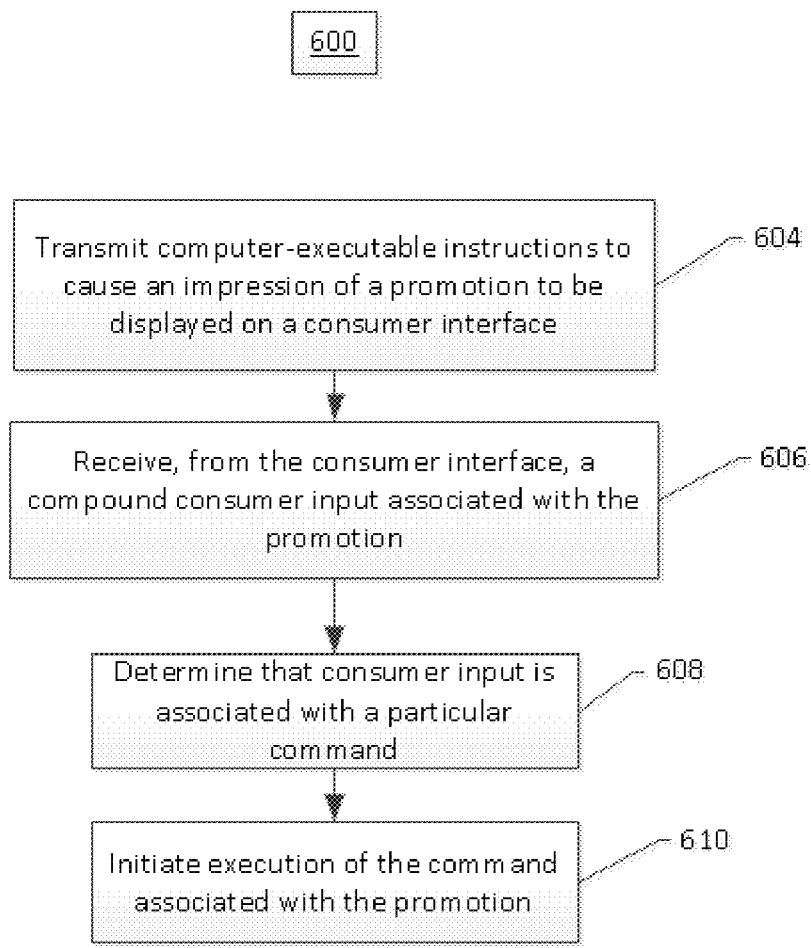
FIG. 6 shows an example method of facilitating a transaction for a promotion in accordance with some embodiments.

FIG. 6 shows an example method 600 of facilitating a transaction in accordance with some embodiments. Method 600, as well as the other methods herein, is discussed as being performed by a consumer device (e.g., consumer device 106), a provider device (e.g., provider device 108), and a server (e.g., server 114 of system 102 including database 116). However, in some embodiments, other suitable structures that can be suitably configured to perform method 600 can be used including circuitry, devices, apparatuses, networks, and/or among other things.

Method 600 may be performed to provide a consumer interface to consumer devices for generating consumer interactions that trigger various commands at the server. In step 604, computer-executable instructions may be sent to cause an impression of a promotion to be displayed on a consumer interface. In step 606, a compound consumer input associated with the promotion may be received from the consumer interface. In step 608, it may be determined that the compound consumer input is associated with a particular command, for example, a purchase command. In step 610, the application program may automatically initiate execution of the command so that the functionality embodied in the command is carried out. In some examples in which the command is a purchase command, the command may be executed to initiate purchase of the item by generating an order for the item.

Figure 7A:
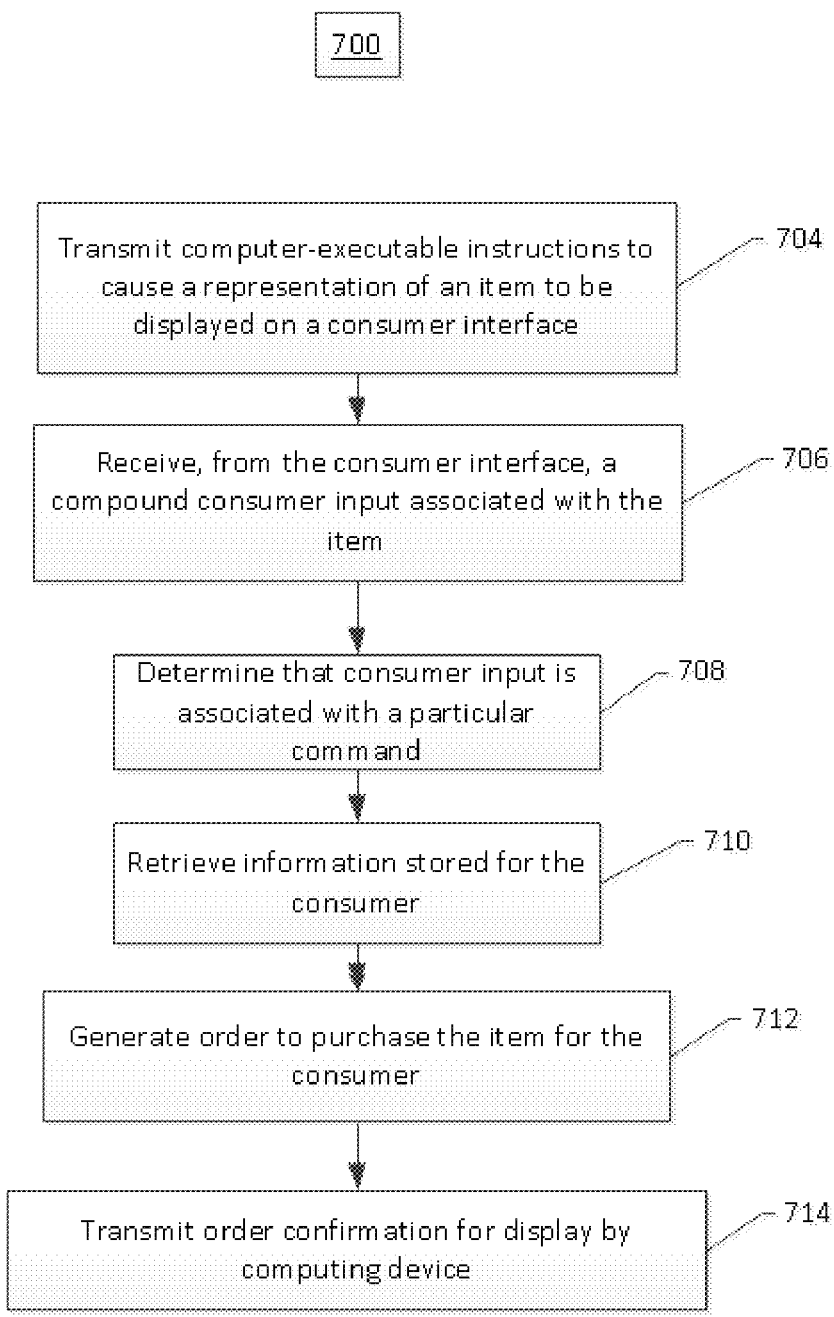
FIG. 7A shows an example method of facilitating a purchase transaction for an item in accordance with some embodiments.

FIG. 7A shows an example method 700 of facilitating a transaction in accordance with some embodiments. Method 700, as well as the other methods herein, is discussed as being performed by a consumer device (e.g., consumer device 106), a provider device (e.g., provider device 108), and a server (e.g., server 114 of system 102 including database 116). However, in some embodiments, other suitable structures that can be suitably configured to perform method 700 can be used including circuitry, devices, apparatuses, networks, and/or among other things.

In one exemplary non-limiting embodiment, a compound consumer input may be provided by a consumer to initiate a purchase command associated with a purchase transaction that may or may not involve a promotion provided by a promotion and marketing service. For example, a consumer may initiate purchase of a gift item using a touchscreen swipe or slide action on a consumer interface. Method 700 may be performed to provide a consumer interface to consumer devices for generating consumer interactions that trigger various commands at the server. In step 704, computer-executable instructions may be sent to cause a representation of an item to be displayed on a consumer interface. In step 706, a compound consumer input associated with the item may be received from the consumer interface. In step 708, it may be determined that the compound consumer input is associated with a particular command, for example, a purchase command. In step 710, information stored for the consumer may be retrieved, for example, payment or identification information. In step 712, an order may be generated to purchase the item for the consumer. In step 714, the order confirmation may be transmitted for display by the computing device of the consumer.

Figure 7B:
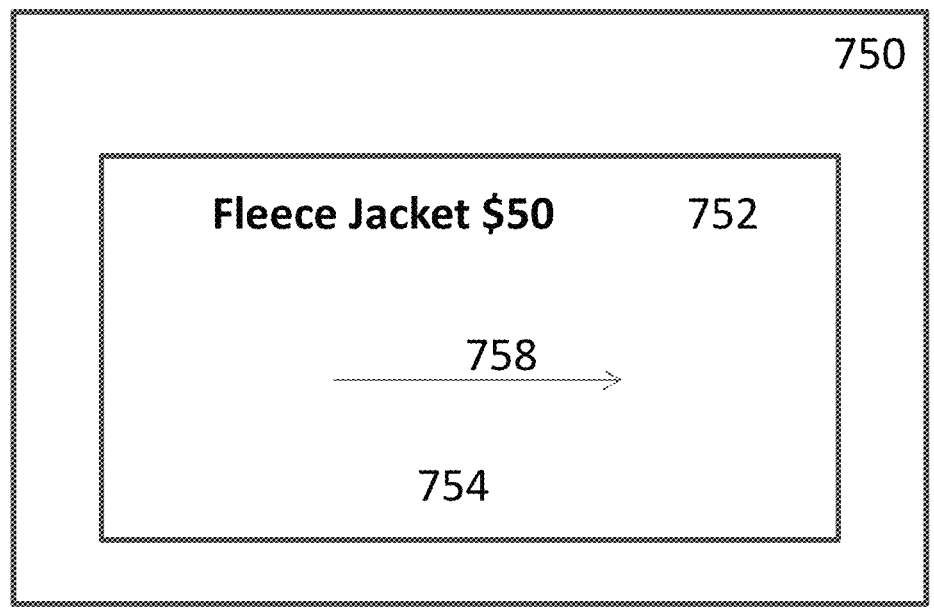
FIG. 7B shows an exemplary consumer interface displaying a representation of an item for purchase.
Figure 7C:
FIG. 7C shows an exemplary consumer interface displaying an order confirmation after purchase of an item.

FIG. 7B shows an exemplary consumer interface 750 displaying a representation of an item 752 for purchase. The consumer interface 750 also includes an interaction region 754 at which a consumer may enter consumer input in relation to the item 752. Upon detection of a particular compound consumer input (e.g., a left-to-right swipe or slide 758) at the interaction region 754, exemplary embodiments may retrieve information stored for the consumer (e.g., identification information, payment information, mailing address, etc.), and automatically generate an order for purchasing the item for the consumer. Exemplary embodiments may then transmit order confirmation for display by the consumer interface, confirming that an order has been placed for the item for the consumer. FIG. 7C shows the exemplary consumer interface 750 displaying an order confirmation 756 after purchase of the item 752. Certain exemplary embodiments may not display an electronic shopping cart and may not associate the item 752 with an electronic shopping cart, as shown in FIGS. 7B and 7C. As illustrated, the purchase transaction may not involve a purchase confirmation interface that requires the consumer to confirm the details of the purchase. That is, the compound consumer input itself is sufficient to authenticate and initiate the purchase command, thereby ensuring a speedy and efficient transaction.

In some embodiments, the compound consumer input may include an input or interaction performed on a touchscreen display of a computing device. These inputs or interactions may include one or more touch actions performed by a consumer via touching or otherwise manipulating a touch-sensitive surface of the touchscreen.

Figure 12A:
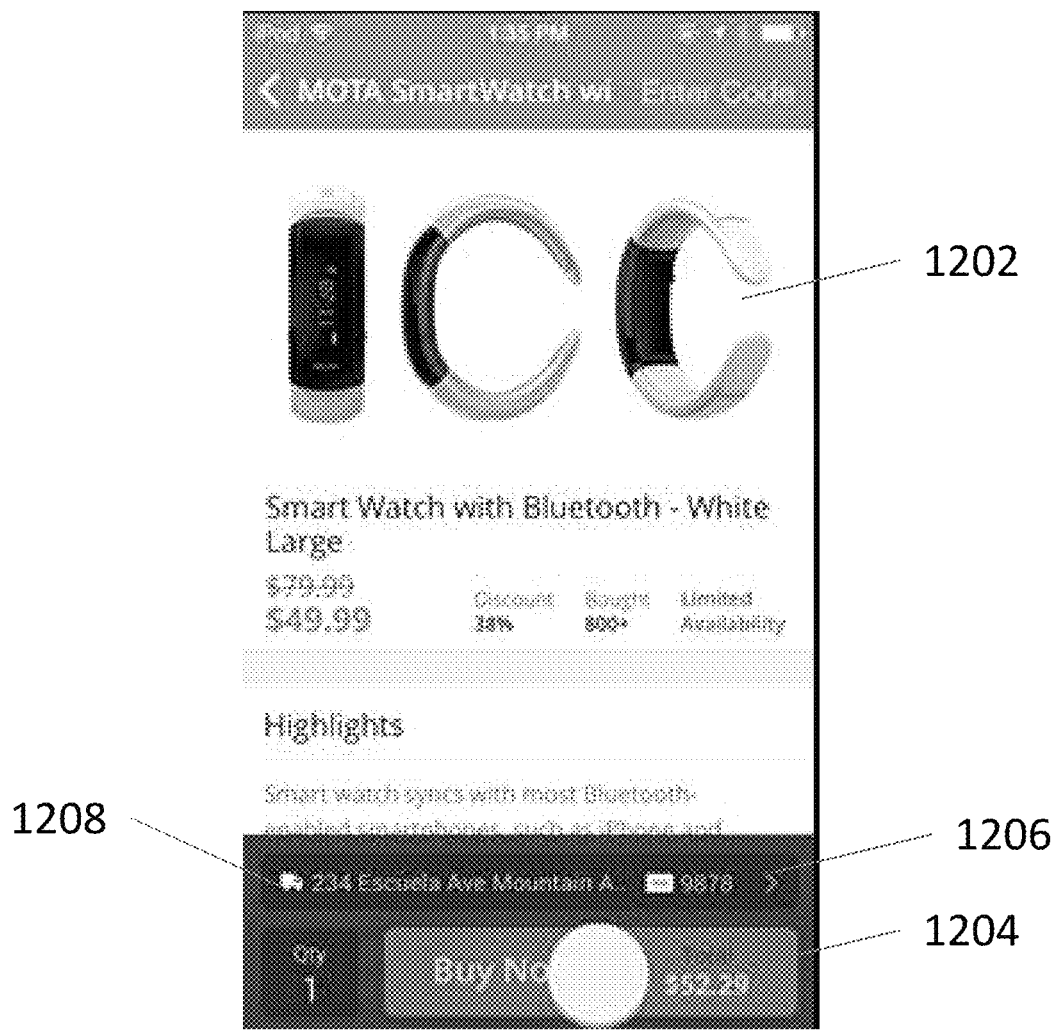
FIGS. 12A and 12B show an exemplary consumer interface in which a touchscreen press action is used to purchase an item.
Figure 12B:
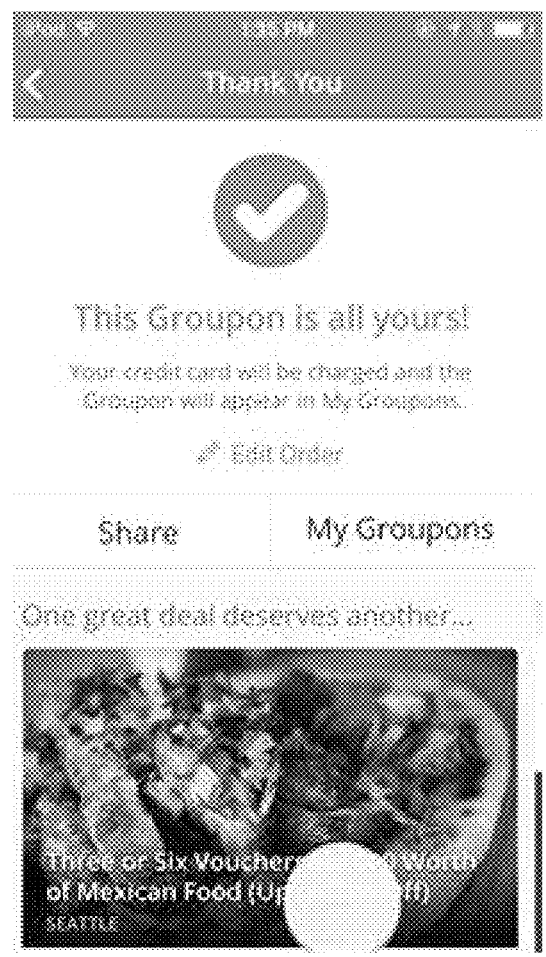

In some embodiments, a touchscreen press action, alone or concurrently with one or more other touchscreen or other inputs, may be associated with a purchase command, e.g., a promotion purchase command. FIGS. 12A and 12B show an exemplary consumer interface 1200 in which a touchscreen press action is used to purchase an item or a promotion for an item. The consumer interface 1200 displays a representation of an item 1202 for purchase. The representation 1202 may be associated with information on the item, for example, a price, a discounted price, a discount level, number of promotions associated with the item that was already purchased, whether the item has limited availability, highlights or detailed information on the item, and the like. The consumer interface 1200 may include an interaction region 1204 (e.g., a "Buy Now" button) at which a consumer may enter consumer input in relation to item 1202. Upon detection of a particular consumer input (e.g., a touchscreen press action) at the interaction region 1204, exemplary embodiments may retrieve information stored for the consumer (e.g., identification information, payment information 1206, mailing address 1208, etc.), and automatically generate an order for purchasing the item for the consumer. Exemplary embodiments may then transmit order confirmation for display by the consumer interface, confirming that an order has been placed for the item for the consumer.

FIG. 12B shows the exemplary consumer interface 1200 displaying an order confirmation after purchase of the item 1202. Certain exemplary embodiments may not display an electronic shopping cart and may not associate the item 1202 with an electronic shopping cart. As illustrated, the purchase transaction may not involve a purchase confirmation interface that requires the consumer to confirm the details of the purchase. That is, the touchscreen press consumer input itself is sufficient to authenticate and initiate the purchase command, thereby ensuring a speedy and efficient transaction.

In some embodiments, a compound consumer input associated with the purchase command may include a continuous touch interaction (e.g., a swipe, a slide, a press-and-hold, a multi-point swipe, a multi-point slide, a screen pull-down action, a drawing or writing motion by the consumer, etc.) on the touch sensitive surface of the touchscreen. For example, the continuous touch interaction may be defined by, on the surface of the a touchscreen: a first point at a first time, a second point at a second time subsequent to the first time, and a third point at a third time subsequent to the third time. In some embodiments, the second point may not form a line with one or more of the first point and the third point, i.e., the first, second and third points may not be collinear. An example of such a compound consumer input is a checkmark.

Figure 8:
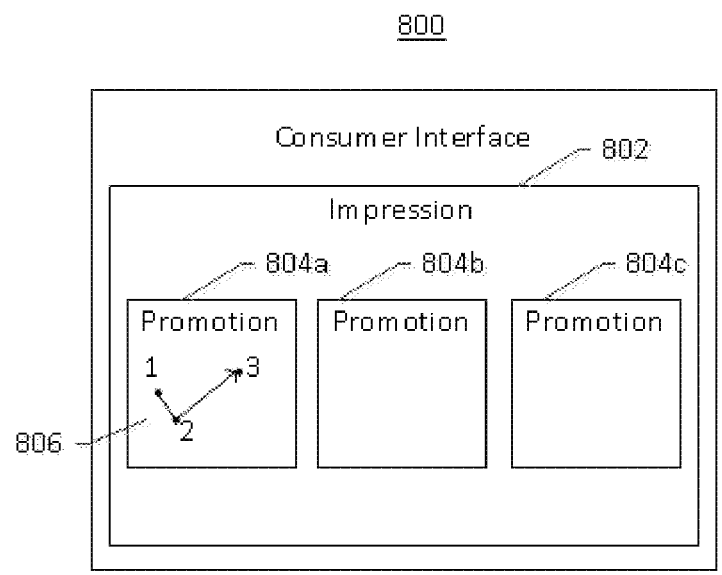
FIGS. 8-11 show examples of consumer interfaces in accordance with some embodiments.

FIG. 8 shows an example consumer interface 800 in accordance with some embodiments. Consumer interface 800 may be an example of a consumer interface that may be provided to a consumer device, such as via an application and/or mobile device application. Consumer interface 800 may include impression 802 including one or more promotions 804a,b,c. Each promotion may include and or be associated with an interaction region, which may be the entire display region of the promotion, a portion of the display region of the promotion, and/or a region separate from the display region of the promotion within impression and/or consumer interface. With reference to FIG. 8, showing consumer interface 800, a compound consumer input 806 defining a checkmark is shown within a promotion 804a. The compound consumer input 806 includes an arrow indicating the movement pattern of the consumer's finger or thumb along the touchscreen to form a checkmark (i.e., moving the consumer's finger from point 1 to point 2 and then to point 3). In some embodiments, a compound consumer input may be defined by the image (e.g., the checkmark) generated by the compound consumer input and/or the direction, velocity, timing, start, (one or more) intermediate, and end points, among other things. For example, the compound consumer input 806 is shown starting at point 1 and proceeding from left to right along the direction of the arrow to point 2, then point 3.

In some embodiments, the server may be configured to provide an impression including one or more flash promotions. The flash promotion may be defined by a limited time window (e.g., a minute, several minutes, an hour, several hours, etc.) in which a promotion may be purchased. Advantageously, the compound consumer inputs that may be associated with the purchase command and/or other techniques described herein may provide for expedient and quick purchase of the flash promotions.

In some embodiments, a continuous compound consumer input may be defined by, on the surface of the touchscreen, a first point held for at least a predefined amount of time (i.e., a press and hold gesture), thereby defining a press and hold. For example, the consumer may touch and hold on the touch sensitive surface for 2 seconds, 5 seconds, etc. Longer hold times, for example, may provide for greater accuracy in determining consumer intent to initiate the purchase command. In some embodiments, the continuous compound consumer input may be additionally defined by at least a second point at a second time subsequent to the predefined amount of time that the first point was held. The first and second points may define a predetermined first direction from the first point to the second point. Here, the compound consumer input may include a hold time at the first point, followed by another input at one or more different points while continuity with the touch sensitive surface is maintained throughout (e.g., press and hold at point 1 before making checkmark 806).

Alternatively or additionally, the another touch interaction may not be continuous with the hold time or may itself not be a continuous touch interaction, such as a discontinuous touch interaction with portions performed within short durations of each other (e.g., less than a second, two seconds, etc.). With reference to FIG. 8, for example, touch interaction 806 may include point 1 being held for (e.g., at least) a predetermined time by the consumer's finger, and then the consumer's finger moving rapidly through point 2 and end proximate point 3. In another example, touch interaction 806 may include moving rapidly from point 1, followed by point 2 being held for a predetermined time, and then proceeding to point 3. In yet another example, touch interaction 806 may include point 1, followed by point 2, followed by point 3 being held for a predetermined time.

In some embodiments, the continuous touch interaction may be defined by, on the surface of the touchscreen, a first point at a first time, a second point at a second time subsequent to the first time, where the first point and the second point define a first direction from the first point to the second point, thereby defining a swipe or slide in the first direction (e.g., up, down, left, right, diagonally, etc.).

Figure 9:
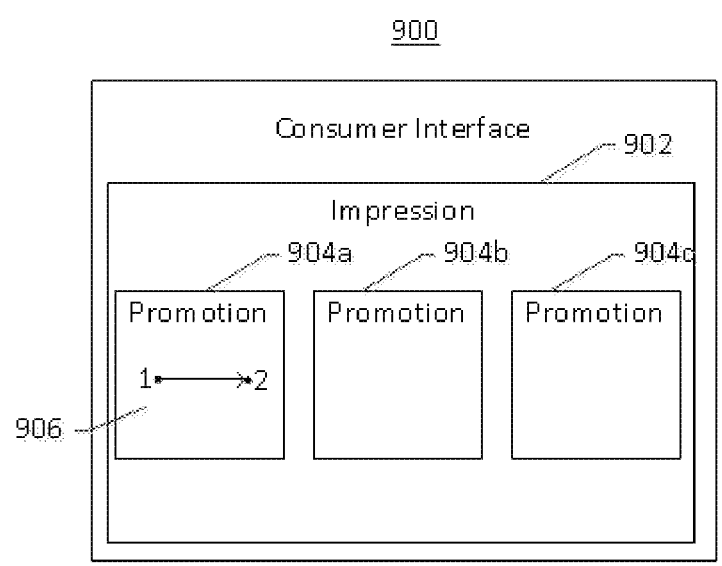

FIG. 9 shows an example consumer interface 900 in accordance with some embodiments. Consumer interface 900 may include impression 902 including one or more promotions 904*a,b,c*. Touch interaction 906 may define a swipe or slide from point 1 to point 2, as indicated by the direction of the arrow.

FIGS. 13A-13D show an exemplary consumer interface 1300 in which a right-to-left touchscreen slide action is used to purchase an item or a promotion for an item. The consumer interface 1300 displays a representation of an item 1302 for purchase. The representation 1302 may be associated with information on the item, for example, a price, a discounted price, a discount level, number of promotions associated with the item that was already purchased, whether the item has limited availability, highlights or detailed information on the item, and the like. The consumer interface 1300 may include an interaction region 1304 (e.g., a "Buy Now" button) at which a consumer may enter consumer input in relation to item 1302.

Upon detection of a particular consumer input (e.g., a right-left touchscreen slide action) at the interaction region 1304, exemplary embodiments may retrieve information stored for the consumer (e.g., identification information, payment information 1306, mailing address 1308, etc.), and automatically generate an order for purchasing the item for the consumer. Exemplary embodiments may then transmit order confirmation for display by the consumer interface, confirming that an order has been placed for the item for the consumer.

In one embodiment, the purchase command may be initiated only after the slide action has continuously moved over at least a threshold distance over the touchscreen or the consumer interface (e.g., from the right edge of the interaction region 1304 to the left edge, or at least halfway across the touchscreen width) and/or for at least a threshold time period. In another embodiment, if the slide action was initiated but did not continuously move at least over the threshold distance and/or for at least the threshold time period, then a purchase confirmation may be requested from the consumer before the purchase command is initiated. This ensures that the purchase command is not initiated by accidental swipe or slide actions on the touchscreen.

In some embodiments, the speed of the touchscreen action may be detected and used in determining whether the action should initiate the purchase command. The speed may be determined as the distance on the touchscreen surface or consumer interface covered by a continuous touchscreen action divided by the time period during which the action is performed. If the speed is detected to be satisfy (e.g., be above) a predetermined threshold, this may indicate that the slide action is accidental and not intended to initiate a purchase command. In this case, even if the threshold distance has been covered by the slide action, the purchase command may not be activated or a purchase confirmation may be requested from the consumer before initiating the purchase command. In another example, if the speed is detected to satisfy (e.g., be above) the predetermined threshold, then the interaction region 1304 may be configured so that a greater distance must be covered by the slide action before the purchase command is initiated. In this manner, the sensitivity of the slide action may be ratcheted down if the speed of the touchscreen action is too high, thereby preventing commands from being initiated accidentally.

Figure 13A:
FIGS. 13A-13D show an exemplary consumer interface in which a touchscreen slide action is used to purchase an item.
Figure 13A:
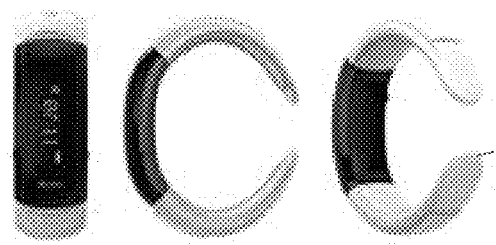
Figure 13A:
Figure 13B:
Figure 13B:
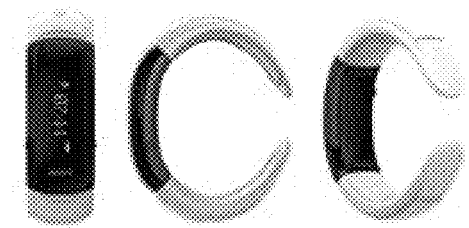
Figure 13B:

FIG. 13B shows the consumer interface 1300 in which, upon start of the right-to-left slide action, the interaction region 1304 may display instructions to the consumer on how to initiate the purchase command (e.g., "keep sliding to buy").

Figure 13C:
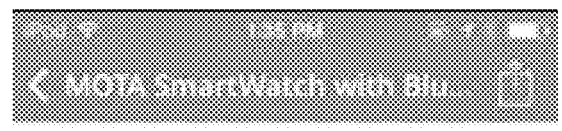
Figure 13C:
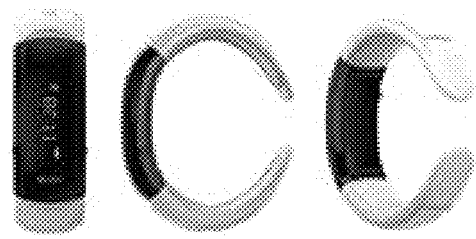
Figure 13C:
Figure 13C:

FIG. 13C shows the consumer interface 1300 in which, during the right-to-left slide action, the interaction region 1304 may display further instructions to the consumer on how to initiate the purchase command (e.g., "release to buy"). In this case, the purchase command may be initiated after the slide action has covered the threshold distance from approximately the right edge to approximately the left edge of the interaction region 1304. The instructions shown in FIG. 13C may be displayed after the threshold distance has been covered and the touchscreen slide action need only be released (i.e., the consumer's finger needs to be raised from the surface of the touchscreen) to initiate the purchase command.

Figure 13D:
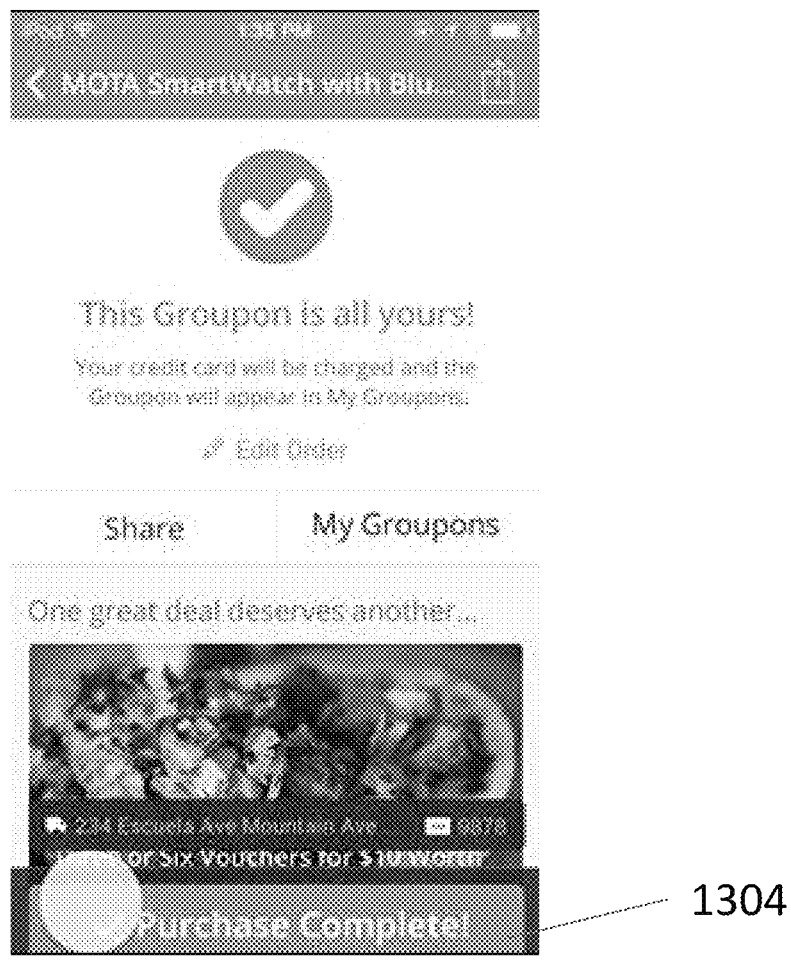

FIG. 13D shows the exemplary consumer interface 1300 displaying an order confirmation after purchase of the item 1302. Certain exemplary embodiments may not display an electronic shopping cart and may not associate the item 1302 with an electronic shopping cart. As illustrated, the purchase transaction may not involve a purchase confirmation interface that requires the consumer to confirm the details of the purchase. That is, the touchscreen slide consumer input itself is sufficient to authenticate and initiate the purchase command, thereby ensuring a speedy and efficient transaction.

In one embodiment, the interaction region 1304 may be configured as a dual-purpose interaction region or purchase button. Two or more types of consumer input may be provided at the interaction region 1304 to initiate two or more modes of purchase. For example, a touchscreen press action may be performed at the interaction region 1304 to initiate a purchase command that may involve displaying a purchase confirmation interface that requires the consumer to confirm the details of the purchase. On the other hand, a touchscreen slide or swipe action (e.g., the right to left slide action illustrated in FIGS. 13A-13C) may be performed at the interaction region 1304 to initiate a purchase command that may or may not involve a purchase confirmation interface that requires the consumer to confirm the details of the purchase. That is, the touchscreen slide consumer input itself is sufficient to authenticate and initiate the purchase command, thereby ensuring a speedy and efficient transaction.

In some embodiments, the continuous touch interaction may be defined by, on the surface of the touchscreen, a first point at a first time, a second point at a second time subsequent to the first time, where the first point and the second point define a first direction from the first point to the second point, thereby defining a pull-down of a screen or user interface component in the first direction (e.g., up, down, left, right, diagonally, etc.).

FIGS. 14A-14D show an exemplary consumer interface 1400 in which a downward pull-down action is used to purchase an item or a promotion for an item. The consumer interface 1400 displays a representation of an item 1402 for purchase. The representation 1402 may be associated with information on the item, for example, a price, a discounted price, a discount level, number of promotions associated with the item that was already purchased, whether the item has limited availability, highlights or detailed information on the item, and the like. The consumer interface 1400 may include an interaction region 1404 (indicating, for example, "pull down to buy instantly") at which a consumer may enter consumer input in relation to item 1402. In some cases, the interaction region 1404 may be configured as a purchase button. In other cases, the interaction region 1404 may be provided in addition to a separate purchase button 1405.

Upon detection of a particular consumer input (e.g., a downward touchscreen pull-down of the interaction region 1404) at the interaction region 1404, exemplary embodiments may retrieve information stored for the consumer (e.g., consumer identification information 1406, payment information 1408, mailing address 1410, etc.), and automatically generate an order for purchasing the item for the consumer. Exemplary embodiments may then transmit order confirmation for display by the consumer interface, confirming that an order has been placed for the item for the consumer.

In one embodiment, the purchase command may be initiated only after the pull-down action has continuously moved over at least a threshold distance over the touchscreen or the consumer interface (e.g., at least halfway down the touchscreen length) and/or for at least a threshold time period. In another embodiment, if the pull-down action was initiated but did not continuously move at least over the threshold distance and/or for at least the threshold time period, then a purchase confirmation may be requested from the consumer before the purchase command is initiated. This ensures that the purchase command is not initiated by accidental pull-down actions on the touchscreen.

In some embodiments, the speed of the touchscreen action may be detected and used in determining whether the action should initiate the purchase command. The speed may be determined as the distance on the touchscreen surface or consumer interface covered by a continuous touchscreen action divided by the time period during which the action is performed. If the speed is detected to satisfy (e.g., be above) a predetermined threshold, this may indicate that the pull-down action is accidental and not intended to initiate a purchase command. In this case, even if the threshold distance has been covered by the pull-down action, the purchase command may not be activated or purchase confirmation may be requested from the consumer before initiating the purchase command. In another example, if the speed is detected to satisfy (e.g., be above) the predetermined threshold, then the interaction region 1304 may be configured so that a greater distance must be covered by the pull-down action before the purchase command is initiated. In this manner, the sensitivity of the pull-down action may be ratcheted down if the speed of the touchscreen action is too high, thereby preventing commands from being initiated accidentally.

Figure 14A:
FIGS. 14A-14D shown an exemplary consumer interface in which a touchscreen screen pull-down action is used to purchase an item.
Figure 14B:

FIG. 14B shows the consumer interface 1400 in which, during the downward pull-down action, the interaction region 1404 may display further instructions to the consumer on how to initiate the purchase command (e.g., "release to buy instantly"). In this case, the purchase command may be initiated after the pull-down action has covered the threshold distance from approximately the top edge of the touchscreen to approximately the midpoint of the touchscreen. The instructions shown in FIG. 14B may be displayed after the threshold distance has been covered and the touchscreen pull-down action need only be released (i.e., the consumer's finger needs to be raised from the surface of the touchscreen) to initiate the purchase command.

In some embodiments, as the interaction region 1404 is pulled down, more information regarding the upcoming purchase may be displayed in the interaction region 1404 (e.g., consumer identification information 1406, payment information 1408, mailing address 1410, total price of the item 1412 etc.).

In some embodiments, a progress indicator 1414 may be displayed on the interaction region 1404 as the interaction region is pulled down to indicate how much farther along the touchscreen the interaction region must be continuously pulled down in order to initiate the purchase command, or for how much more time the region must be pulled down in order to initiate the purchase command. In one example, the indicator 1414 may be a radial indicator showing a degree of completion of the required touchscreen action for initiating the purchase command.

In one embodiment, the speed at which the interaction region 1404 is pulled down (or expanded to occupy a larger area on the consumer interface) may be varied during the pull-down process. The pull-down of the interaction region 1404 may proceed at the pace of the consumer's touch or finger until a distance threshold is crossed, after which the pull-down may proceed at a slower pace than that of the consumer's touch or finger. For example, the distance threshold may be set to about 260 dp (density independent pixel) from the origin of the consumer's consumer input (i.e., the consumer's initial touch) within the interaction region 1404. Once the distance threshold is crossed by the consumer input, the interaction region 1404 may be pulled down at an exemplary pace that is a fraction of the pace of the consumer's touch or finger (e.g., $1/10^{th}$, $1/9^{th}$, $1/8^{th}$, $1/7^{th}$, $1/6^{th}$, $1/5^{th}$, $1/4^{th}$, $1/3^{rd}$, $1/2$). By limiting the speed of the pull-down, embodiments ensure that the purchase command is initiated only deliberately by the consumer and not by accidental inputs provided at the interaction region 1404.

In one embodiment, once the distance threshold is crossed, the consumer may be allowed to initiate execution of the purchase command. In this case, the message or instruction to the consumer provided at the interaction region 1404 may be changed from "Keep pulling to buy instantly" to "Release to buy instantly" to indicate that the consumer input may be completed to initiate the purchase command.

In another embodiment, the pull-down of the interaction region 1404 may proceed at the pace of the consumer's touch or finger until a speed threshold is crossed, after which the pull-down may proceed at a slower pace than that of the consumer's touch or finger. For example, the speed threshold may be set to about 7 dp (density independent pixel) detected between two measurements of biometric input location of the consumer's touch performed one immediately after the other within the interaction region 1404. Once the speed threshold is crossed by the consumer input, the interaction region 1404 may be pulled down at an exemplary pace that is a fraction of the pace of the consumer's touch or finger (e.g., $1/10^{th}$, $1/9^{th}$, $1/8^{th}$, $1/7^{th}$, $1/6^{th}$, $1/5^{th}$, $1/4^{th}$, $1/3^{rd}$, $1/2$, $3/4^{th}$, ⅘ᵗʰ). By limiting the speed of the pull-down, embodiments ensure that the purchase command is initiated only deliberately by the consumer and not by fast accidental inputs provided at the interaction region 1404. The purchase command may be initiated only after the interaction region 1404 is pulled down to a predetermined distance over the touchscreen. Thus, limiting the speed of the pull-down ensures that the purchase command initiation takes a longer time and that the purchase command is not initiated by fast accidental inputs.

Figure 14C:

FIG. 14C shows the exemplary consumer interface 1400 in which the indicator 1414 indicates that the purchase command has been initiated. A message such as "purchasing . . . " may be displayed. The exemplary interaction of FIG. 14C may be displayed after the required touchscreen action has been completed, e.g., after the pull-down is completed and the consumer's finger removed from the touchscreen as instructed in FIG. 14B.

Figure 14D:
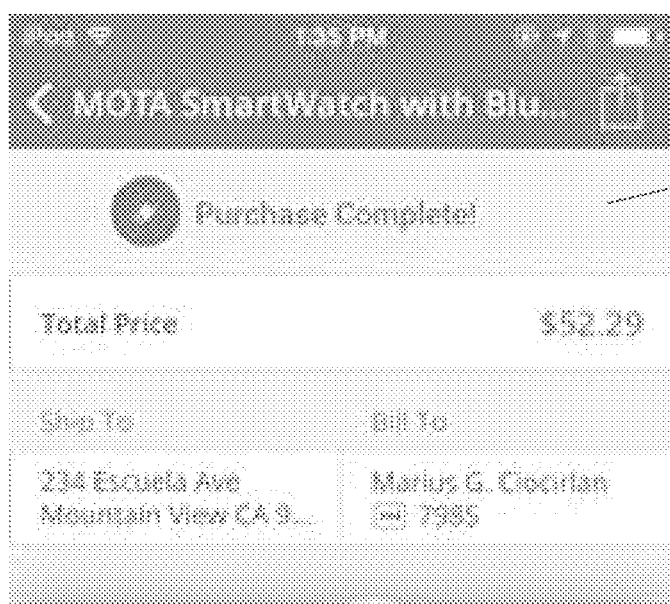
Figure 14D:
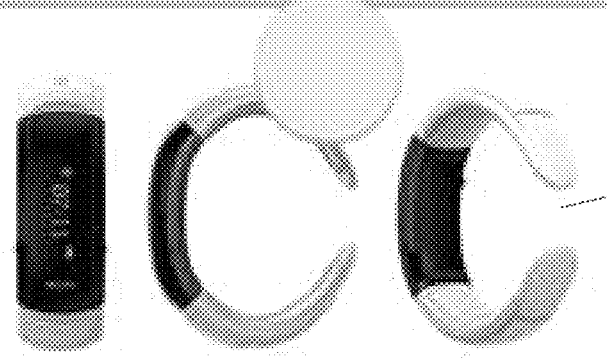
Figure 14D:

FIG. 14D shows the exemplary consumer interface 1400 displaying an order confirmation after purchase of the item 1402. Certain exemplary embodiments may not display an electronic shopping cart and may not associate the item 1402 with an electronic shopping cart. As illustrated, the purchase transaction may not involve a purchase confirmation interface that requires the consumer to confirm the details of the purchase. That is, the touchscreen pull-down consumer input itself is sufficient to authenticate and initiate the purchase command, thereby ensuring a speedy and efficient transaction.

In one embodiment, the interaction region 1404 may be configured as a dual-purpose interaction region or purchase button. Two or more types of consumer input may be provided at the interaction region 1404 to initiate two or more modes of purchase. For example, a touchscreen press action may be performed at the interaction region 1304 to initiate a purchase command that may involve a purchase confirmation interface that requires the consumer to confirm the details of the purchase. On the other hand, a touchscreen pull-down action (e.g., the downward action illustrated in FIGS. 14A-14C) may be performed at the interaction region 1404 to initiate a purchase command that may or may not involve a purchase confirmation interface that requires the consumer to confirm the details of the purchase. That is, the touchscreen pull-down consumer input itself is sufficient to authenticate and initiate the purchase command, thereby ensuring a speedy and efficient transaction.

In some embodiments, the continuous touch interaction may be defined by a first point at a first time within the interaction region, a second point a second time at a purchase drop region of the consumer interface, where the second time is subsequent to the first point; and a discontinuation of the continuous touch interaction subsequent to the second time. For example, consumer interface may include a button and/or icon associated with the promotion at the first point and a second "buy" drop region at the second point, thereby defining a "drag and drop" of the button and/or icon within the drop region. In some embodiments, the consumer interface may include a visual representation of the drag and drop. For example, the button and/or icon may move with the touch interaction location to the drop region while tracking the location of the touch impacts. In some embodiments, the continuous touch interaction may be alternatively or additionally defined by the first point being held for at least a predefined amount of time prior to the first time. In general, one or more continuous compound consumer inputs (e.g., which may or may not be continuous compound consumer inputs) may be combined within a single compound consumer input and associated with a discrete command. For example, a continuous left swipe or slide may be combined with a subsequent continuous right swipe or slide as a single compound consumer input.

Figure 10:
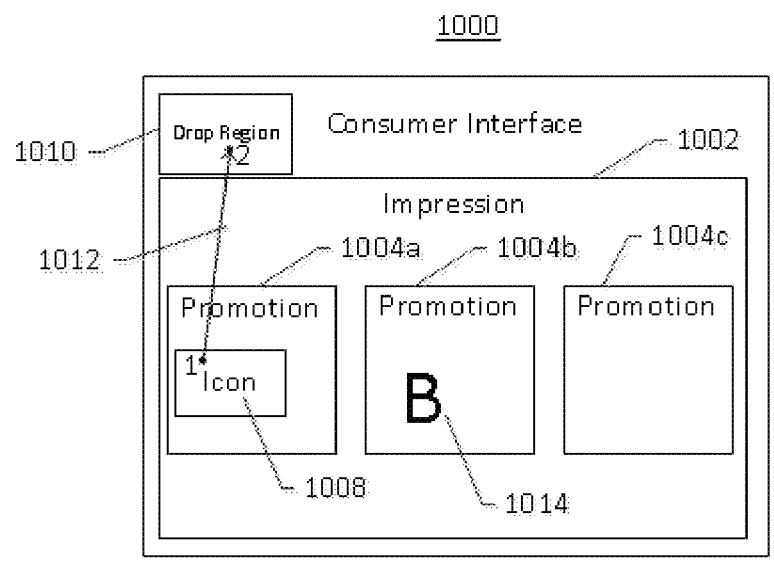

FIG. 10 shows an example consumer interface 1000 in accordance with some embodiments. Consumer interface 1000 may be configured to provide drag and drop consumer interactions and may include impression 1002 including one or more promotions 1004a,b,c. A promotion 1004a may include promotion icon 1008. Consumer interface 1000 may further include drop region 1010. Here, touch interaction 1012 may define a selection of a promotion with a continuous touch interaction starting from point 1, within promotion icon 1004a, to point 2 within drop region 1010, as indicated by the arrow.

Figure 11:
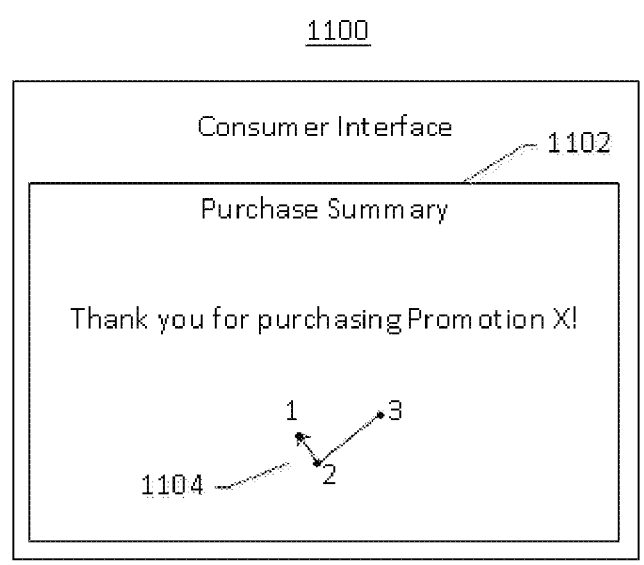

FIG. 11 shows an example consumer interface 1100 illustrating a purchase summary display 1102 indicating the initiation and/or completion of a purchase command. Consumer interface 1100 may be configured to receive a reverse consumer input, such as touch interaction 1104 defined by starting at point 3, to point 2, to point one in the direction opposite of touch interaction 806 shown in FIG. 8. Touch interaction 1104 may be associated with the cancel purchase command while touch interaction 806 may be associated with the purchase commands.

In some embodiments, a compound consumer input may not be continuous. For example, a compound consumer input may include a plurality (e.g., 2, 3, etc.) of discontinuous consumer inputs at substantially a single location on the surface of a touchscreen. The plurality of discontinuous consumer inputs may be performed within a short duration of each other (e.g., less than a second), thereby defining a double tap, triple tap, etc.

In some embodiments, a compound consumer input may include a multi-touch compound consumer input including two or more touch inputs that are each continuous. For example, the consumer may perform a swipe, a slide, hold, drag and drop, etc., and/or combinations thereof, with two or more touch inputs that are each continuous. In another example, a compound consumer input may be defined by a pinch with two or more touch inputs (e.g., applying two fingers to the touch screen and while maintaining contact with the touchscreen, bringing the two fingers towards each other) or an unpinch (e.g., applying two fingers to the touch screen and while maintaining contact with the touchscreen, bringing the two fingers away from each other). Alternatively, one or more of the touch inputs within a single multi-touch compound consumer input may not be continuous. For example, a first touch consumer input may include a press and hold that is simultaneous with a second touch consumer input (e.g., continuous or otherwise).

In some embodiments, a compound consumer input may include and/or be defined by one or more of: one or more characters, one or more words, one or more numbers, and/or one or more symbols. For example, the server may be configured to recognize character(s), words(s), number(s), and/or symbol(s) to determine an applicable command. In the example of a promotion purchase command, a compound consumer input may be defined by the user writing the letter "B" or "b," representing "buy," as shown by compound consumer input 1014 (i.e., where the user traced the letter "B" proximate the promotion 1004b on the touchscreen) in consumer interface 1000 of FIG. 10. In another example, the consumer may be allowed to purchase a selected number of instances of the promotion by providing a compound consumer input defined by a number within the interactive region of the promotion. For example, a consumer who traced the number "3" to the touchscreen proximate to the promotion 1004 of FIG. 10 may initiate a promotion purchase command indicating that three promotions be purchased.

In some embodiments, a compound consumer input may be determined based on a location of the consumer device. For example, the location may be determined using any suitable technique including a global positioning system (GPS), triangulation (e.g., cell tower triangulation), internet protocol (IP) address, and/or proximity based direct wireless connections (e.g., with a wireless personal area network (PAN) such as Bluetooth, IrDA, Wireless USB, Z-Wave, ZigBee, Body Area Network, etc.). The server may be configured to determine a location of the consumer device, determine a language associated with the location, and determine the compound consumer input based at least in part on the language. For example, while "B" may be used as the compound consumer input representing "buy" in an English speaking location, "C" may be used representing "comprar" in a Spanish speaking location. In another example, such as for a Chinese speaking location, the Chinese character for buy may be used. In some embodiments, a language based compound consumer input may be additionally or alternatively set by the consumer via the consumer device.

In some embodiments, the server and/or consumer device may be configured to associate a first compound consumer input with a first command and a second compound consumer input with a second command. As discussed in greater detail below, the second command may be different from the first command which may be a purchase command. Similarly, the second compound consumer input may be different from the first compound consumer input associated with the purchase command. In some embodiments, the second compound consumer input may include one or more of the consumer inputs entered on a touchscreen. In some embodiments, the first and second compound consumer inputs (and/or one or more additional compound consumer inputs) may collectively comprise a continuous compound consumer input. Each additional command may be associated with a different compound consumer input, and the functionality of the server may be configured to process the additional commands accordingly.

In some embodiments, the second command may include a promotion removal command. Processing the second command may include removing the promotion from the impression. Processing the second command may also include the server receiving an indication from the consumer device evidencing a lack of interest by the consumer in the promotion associated with the second command. In some embodiments, a different promotion may be provided (e.g., by the server) to the impression within the consumer interface in connection with processing the promotion removal command. In some embodiments, the second command may include a promotion request command. Processing the second command may include providing a second impression including a second promotion different from the one or more promotions of the impression to the consumer interface and/or providing the second promotion to the first impression. As such, a consumer may be allowed to indicate that a particular promotion is not of interest and/or request another promotion.

In some embodiments, the second command may include a cancel purchase command. Processing the second command may include canceling and/or foregoing the transaction for the promotion (e.g., based on stored payment data or otherwise). For example, the cancel purchase command may be provided to the user interface subsequent to (e.g., within a predetermined period of time) the purchase command. In some embodiments, such as when the server is configured to a purchased summary and/or "thank you for the purchase" indicator, the cancel purchase command may be initiated while these displays are shown on the consumer interface. In another example, the consumer may be allowed to view a listing of promotions, each including an interaction region capable of receiving the compound consumer input associated with the cancel purchase command.

In some embodiments, the second command may include a promotion bookmark command. Processing the second command may include associating the promotion indicated by the second compound consumer input (e.g., provided within the interaction associated with the promotion) with the consumer without facilitating the transaction until a purchase command has been initiated. For example, the bookmarked promotion may be provided within one or more subsequent impressions for future consideration by the consumer. In another example, the consumer interface may be configured to provide a bookmarked promotion impression including one or more (e.g., all) of the promotions that have been bookmarked by the consumer.

In some embodiments, the second command may include a promotion details command. Processing the second command may include providing promotion data associated with the promotion to the consumer interface. The promotion data may include promotion parameters associated with the promotion (e.g., accepted value, promotional value, items, redemption time, etc.). The promotion data may further include a more detailed description of the promotion, the terms of the promotion, the purchase terms of the promotion, one or more images, texts, references (e.g., hyperlinks), videos, audio, etc.

In some embodiments, the second command may include a quantity command defining a number of instances of the item or promotion selected for purchase. For example, the second compound consumer input may be provided in connection with, prior to, and/or subsequent to the compound consumer input associated with the purchase command. Processing the second command may include facilitating the transaction for one or more instances of the item or promotion based on the quantity command. For example, a compound consumer input of a consumer tracing the number "6" on a touchscreen may be associated with a quantity command defining six instances of the promotion for purchase. In another example, a drag and drop compound consumer input may be used, such as by the consumer dragging a button and/or indicator of an item or promotion to a purchase drop region associated with six instances of the item or promotion. In yet another example, a voice compound input may be used such that the consumer may say "six" in connection with providing a compound consumer input on a touchscreen associated with the purchase command.

In some embodiments, the second command may include a parameter selection command. For example, a promotion may include user selectable promotion parameters and/or predefined groups of promotion parameters (e.g., select a first promotion parameter group of a promotion including a $5 accepted value and a $10 promotional value promotion and/or second promotion parameter group of the promotion including a $10 accepted value and a $20 promotional value). Processing the second command may include determining the selected one or more promotion parameters of the promotion and providing the promotion including the selected one or more promotion parameters to the consumer. Advantageously, two step techniques for selecting a promotion and then selecting promotion parameters may be reduced to a single step and/or single compound consumer input. In some embodiments, the promotion parameter command may include a multi-touch command. For example a first touch may select a promotion and a second touch, while the first touch is held, may be used to select the one or more promotion parameters.

In some embodiments, the second command may include a relevance indicator command. The relevance indicator command may indicate that a consumer is interested in a provider associated with an item or promotion, a category (e.g., type of product, service, and/or experience) associated with the item or promotion, a price range and/or provider quality associated with the item or promotion, one or more parameters associated with the item or promotion, and/or among other things. Processing the second command may include: determining one or more parameters of the item or promotion, associating or de-associating the one or more parameters with a consumer account as being relevant to a consumer, determining a second item or promotion different from the item or promotion based on the one or more parameters, and displaying a second representation of the second item on the consumer interface.

In some embodiments, the second command may include an irrelevance indicator command. The irrelevance indicator command may indicate that a consumer is not interested in a provider associated with a promotion, a promotion category (e.g., type of product, service, and/or experience) associated with the promotion, a price range and/or provider quality associated the promotion, one or more promotion parameters associated with the promotion, and/or among other things. Processing the second command may include: determining one or more promotion parameters of the promotion, associating the one or more promotion parameter with a consumer account as being irrelevant to a consumer account and/or disassociating the one or more promotion parameter with the consumer account, and/or determining a second promotion different from the one or more promotions based on the one or more promotion parameters being irrelevant to the consumer account. The server may be further configured to generate and/or provide a subsequent impression including a relevance-based promotion in accordance with the relevance indicator command and/or the irrelevance indicator command.

In some embodiments, the second command may include a share promotion command indicating an online social network account and/or consumer intent to share the promotion with a second consumer via any suitable technique and/or communication channel. Where the second command indicates intent to share within an online social network, processing the second command may include providing an impression of the promotion to at least one social network user associated with the online social network account of the consumer providing the associated compound consumer input. In some embodiments, different compound consumer inputs may be associated with different social networks and/or communication channels. For example, a compound consumer input tracing the letter "F" on a touchscreen may be associated with a share promotion command to share the promotion with a Facebook account, while a compound consumer input tracing the letter "T" on a touchscreen may be associated with a share promotion command to share the promotion using a text message. Similarly, a compound consumer input tracing the letter "E" may be associated with a share promotion command to share the promotion using an email.

In some embodiments, the second compound consumer input (e.g., associated with a command other than the purchase command) and/or the first compound consumer input associated with the purchase command may include an interaction or consumer input that does not involve a touchscreen. For example, a compound consumer input may include one or more of: a voice interaction detected by a microphone, a visual interaction detected by a camera, and/or a motion interaction (e.g., tilting, shaking, rotating and/or otherwise moving the consumer device) detected by a motion sensor such as an accelerometer and/or gyroscope. In some embodiments, a compound consumer input may further include a biometric sensor, such as a fingerprint and/or retinal scan.

For example, a voice interaction may include the consumer saying "buy" to purchase a promotion displayed within the consumer interface. A visual interaction may include one or more blinks, a smile (e.g., mood recognition), and/or one or more nods to indicate a purchase command. In another example, a visual interaction may indicate a promotion irrelevance command such as via a visual interaction including a head shake, a frown, etc. A motion interaction may include, for example, a shake of the consumer device which may indicate a promotion request command, a promotion irrelevance command, and a promotion relevance command, among other things.

In some embodiments, the second compound consumer input may include an intuitive correspondence with the compound consumer input associated with the purchase command. For example, where compound consumer input associated with the purchase command is defined by a swipe or slide in a first direction and/or otherwise, the second compound consumer input may include a second continuous touch interaction defined by: a first point at a third time and a second point at a third time subsequent to the third time, where the first point and the second point define a second direction from the first point to the second point different from the first direction. For example, swiping up, down, left, right, and/or in various diagonal directions within an interaction region of a promotion may each be associated with a different command associated with the promotion. In some embodiments, swiping up may indicate a promotion relevance command, swiping down may indicate a promotion irrelevance command, swiping left may indicate a promotion bookmark command, and swiping right may indicate a purchase command, e.g., promotion purchase command. In another example, swiping up may indicate an increase quantity command while swiping down may indicate a decrease quantity command.

As discussed above, in some embodiments, a single continuous touch interaction may be associated with a plurality of commands. For example, the server and/or consumer device may be configured to associate a first portion of the continuous touch interaction with the purchase command and a second portion of the continuous touch interaction with a second command. The second command, for example, may include a purchase command associated with a first line formed by a first point and a second point of a checkmark. The promotion data may be displayed within the consumer interface while the second point is held by the consumer. Upon initiating the second line of the checkmark formed by the second point and a third point, the purchase command may be initiated.

In some embodiments, a compound consumer input may include a reverse input of another compound consumer input. A reverse consumer input, as used herein, may refer to a reverse touchscreen input, such as a reverse checkmark going from the third point, to the second point, to the first point (e.g., from right to left rather than left to right). Various intuitive commands may be associated with pairs of compound consumer inputs and its reverse compound consumer input. For example, where the purchase command is a checkmark, the cancel purchase command may be a reverse checkmark. Other input devices and associated input data may also include reverse consumer inputs or otherwise corresponding inputs associated with opposite commands. In the example of a camera device, the compound consumer input for the purchase command may include one or more head nods (e.g., moving up and down), while the reverse consumer input or reverse compound consumer input may include a headshakes (e.g., turning left and right). In another example of a motion sensor device, a compound consumer input may include an up and down shake of the consumer device and the associated reverse compound consumer input may include a side to side shaking of the consumer device. For example, shaking the mobile device may be associated with a promotion relevance command, a promotion irrelevance command, or a promotion request command (e.g., by triggering the use of a different relevance algorithm and/or different promotion parameters).

In some embodiments, three or more compound consumer inputs may be used. The three or more compound consumer inputs may be part of a continuous touch interaction or otherwise. For example, a second compound consumer input may be associated with a second command including a promotion details command and a third compound consumer input may be associated with a third command including a cancel purchase command. Returning to the example of the checkmark, a first compound consumer input may be associated with the promotion details command and may include the first line of the checkmark defined by a first point and a second point, a second compound consumer input may be associated with the second line of the checkmark defined by the second point and a third point, and a third compound consumer input may be associated with the a reverse checkmark defined by a third point, a second point, a first point (e.g., defining a reverse direction from the first and second compound consumer inputs). In some embodiments, a continuous touch interaction may be defined by a plurality of points, each of which may be associated with a different command.

In certain embodiments, a consumer may send one or more messages on a social networking website to initiate execution of a purchase command associated with an item offered for sale by a commercial entity (e.g., merchant) or associated with a promotion offered for sale by a promotion and marketing service. In one embodiment, a consumer may have an account with a website or a mobile application offered by the promotion and marketing service. The consumer may also have an account with a social network website, e.g., the Twitter, Facebook, etc., social networking sites. The consumer may log onto his promotion and marketing service account and connect tot his social networking site account. In one example, the consumer may log onto his promotion and marketing service account using a compound consumer input, for example, by creating the letter "G" using a finger on a touchscreen. Similarly, the consumer may connect to his social networking site account using a compound consumer input, for example, by creating the letter "T" to connect to his Twitter account. The identity of the consumer may be validated for authenticity using any suitable technique, for example, password verification and/or biometric verification (using techniques disclosed herein). Fraud checks may be performed during this connection process.

In order to inform consumers of a promotion or item available for purchase, the promotion and marketing service may send a message on a social networking site, for example, by "tweeting" about the item or promotion on the Twitter social networking site. The promotion and marketing service may have its own account on the social networking site for this purpose. A consumer may resend or otherwise endorse the message transmitted by the promotion and marketing service. In one example, a consumer may "retweet" the message with a favorable comment (e.g., "What a deal!"). The consumer's "retweeting" of the message may be seen by the followers of the consumers on the social networking site.

The promotion and marketing service may monitor the consumer's "retweet" of the original message and, based on one or metrics, the promotion and marketing service may automatically initiate a purchase command of the item or promotion for the consumer. If the consumer's followers also "retweet" the message regarding the item or promotion, the promotion and marketing service may perform one or more of the following actions: automatically initiate a purchase command for the followers, automatically create an account on the promotion and marketing service for the followers, automatically provide a discount or promotion to the followers, and the like.

Determination of Item Relevance Based on Compound Consumer Input

Exemplary embodiments enable the use of compound consumer inputs entered by a consumer using a consumer interface in indicating whether an item is of relevance to a consumer and in further enabling the determination of a relevance score and/or an irrelevance score for the item. In one embodiment, a compound consumer input may be predefined or may be defined by a consumer as corresponding to a relevance command such that receipt of the compound consumer input causes the relevance to be executed. A consumer interface may be displayed on a computing device associated with a consumer, including representations of one or more items and a region for accepting consumer input. Using the consumer interface, a consumer may enter the compound consumer input corresponding to the relevance command which may automatically initiate execution of the relevance command.

A relevance command may be a computer-executable command or functionality that assigns information or a score regarding the relevance of an item to a consumer. An exemplary relevance command, when executed, may analyze the compound consumer input to detect information provided by the consumer regarding the selected item. In one example, the compound consumer input may constitute the consumer tracing a numerical (e.g., from 1 to 5) or alphabetical (e.g., from A to E) feedback or rating for the item that may be used to quantitatively assess the relevance of the item to the consumer. In another example, the compound consumer input may constitute the consumer tracing a checkmark (indicating a favorable assessment) or a cross sign (indicating a non-favorable assessment).

Upon detecting information about the consumer's assessment of the item or the relevance of the item to the consumer, the relevance command may analyze one or more characteristics of the item to determine other items that may be of relevance to the consumer. These characteristics may include, but are not limited to, a category of the item (e.g., shoes, clothing), a price range for the item, a location of sale of the item, a subject matter of the item (e.g., outdoors, high fashion), a merchant offering the item, a brand of the item, a discount level of the item, and the like.

Based on the current compound consumer input entered by the consumer and, optionally, previous relevance assessments performed for the consumer, the relevance command may generate a quantitative and/or qualitative indication or score for the relevance of the item to the consumer. For example, the score assigned by the relevance command may indicate a likelihood or a strength of the consumer's interest in items having one or more characteristics in common with the item represented in the consumer interface. In one embodiment, the relevance command may assign an overall relevance score to the item, indicating whether that item in particular or whether similar items in general are of relevance to the consumer. In other embodiments, the relevance command may also assign characteristic-specific relevance scores indicating, for example, whether other items sharing a particular characteristic may be of relevance to the consumer.

Figure 15:
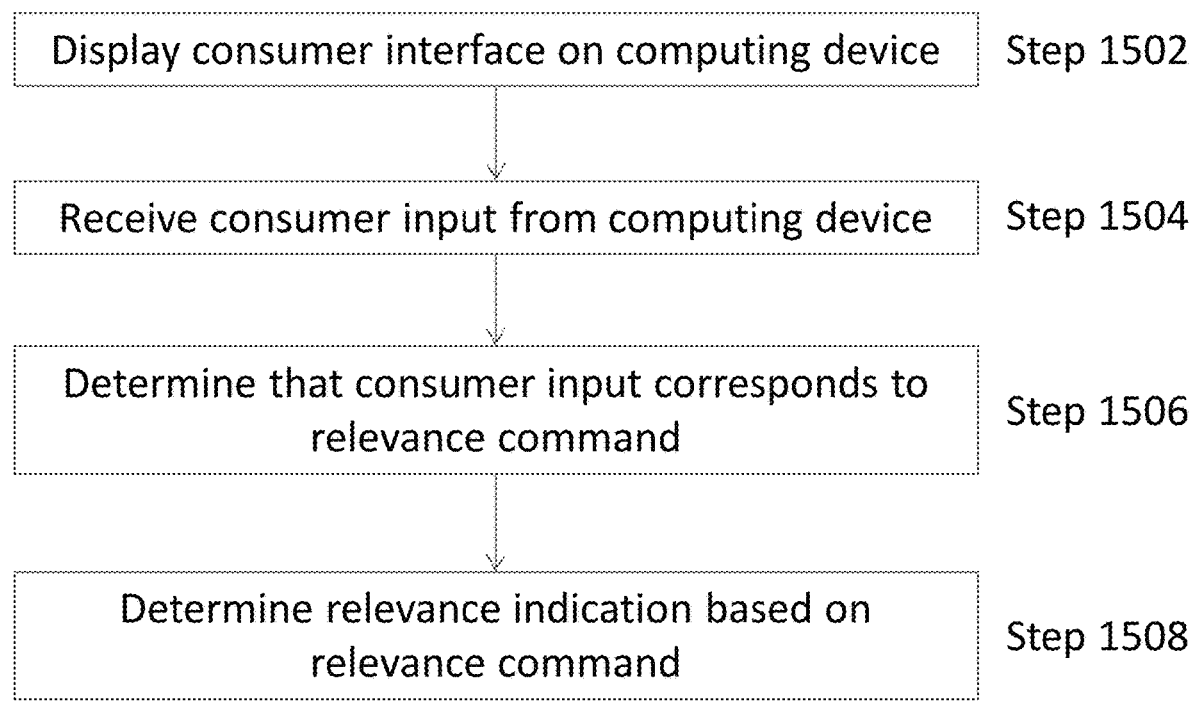
FIG. 15 shows an example method of using a relevance indication received from a consumer.

FIG. 15 is a flowchart illustrating a computer-executed method for enabling indication of a relevance of an item (e.g., a promotion provided by a promotion and marketing service). In step 1502, a consumer interface may be displayed on a visual display of a computing device associated with a consumer. The consumer interface may render representations of one or more items (e.g., impressions of promotions). In step 1504, a compound consumer input may be received at the computing device with respect to at least one of the items.

In step 1506, it may be determined that the compound consumer input corresponds to a relevance command, and the display of the display on the consumer interface may be adjusted based on the relevance command. Exemplary touchscreen consumer input may include, but is not limited to, selection of a "thumbs up" option to indicate higher relevance and a "thumbs down" option to indicate lower relevance, drawing of a question mark to indicate that the consumer is unsure of the relevance or to indicate lower relevance, drawing of an "X" indicating that the consumer is not interested, input of a relevance score directly indicating the relevance, input of a feedback score indicating the consumer's assessment of the item, and the like.

In step 1508, based on the relevance command, a relevance indication (e.g., a relevance score) may be determined for one or more characteristics of the at least one item.

In certain embodiments, the relevance indication may be used to determine one or more additional items for display on the consumer interface. For example, if an item in the "sports" category is determined to be of relevance to a consumer, then representations for more items in the "sports" category may be displayed to the consumer. In some embodiments, the relevance indication may be processed by a relevance engine to determine one or more consumer profile data items to indicate characteristics of items of interest to the consumer. For example, if the consumer has frequently rated "hiking" equipment highly, then a consumer profile data item may be generated to indicate that the consumer is "outdoorsy." The relevance engine may determine or adjust characteristics of items offered to the consumer in the future based on the profile data. Subsequently, in certain embodiments, the consumer interface may be updated to display representations of one or more additional items that may be of interest to the consumer based on the analysis performed by the relevance engine.

In certain exemplary embodiments, the consumer interface may be automatically adjusted based on the relevance indication generated in order to emphasize the display of more relevant information to the consumer. In one example, upon determining that a first item is of high relevance (e.g., having a relevance score above a predetermined threshold), the list of items may be adjusted or reordered to bring a representation of the first item to the top. In another example, upon determining that a second item is of low relevance (e.g., having a relevance score below a predetermined threshold), the list of items may be adjusted or reordered to bring a representation of the second item to a suitable lower level or to remove it entirely from the consumer interface. In another example, the representations of items may be randomly reordered or reorganized. In one example, such a random reorganization may be initiated by a compound consumer input that includes a shaking action of the computing device, as detected by an accelerometer in the device.

In certain embodiments, a consumer input definition interface may be displayed on the consumer interface to allow the consumer to define a consumer input that, when entered, will initiate the relevance command. The consumer input definition interface may include an indication of the relevance command. Input definition data may be received from the consumer input definition interface to define a consumer interaction. The consumer input may be generated based on the input definition data and associated with the relevance command. In some cases, the consumer input may be the same consumer interaction defined by the input definition data or an approximation thereof. The association between the consumer input generated and the relevance command may be stored on a non-transitory storage device for the particular consumer.

In certain embodiments, a single compound consumer input may be defined and used to invoke both a relevance command and one or more additional commands. In this embodiment, a first portion of the compound consumer input (e.g., a left-to-right swipe or slide) may invoke the relevance command, while a second portion of the compound consumer input (e.g., a subsequent continuous right-to-left swipe or slide) may invoke a purchase command. The two commands may be invoked concurrently or sequentially in order in which their corresponding consumer inputs are entered in the single compound consumer input.

Use of Biometric Information in Facilitating Transactions

Exemplary embodiments enable the use of biometric information in facilitating initiation of transactions based on consumer input. In certain embodiments, a transaction may be facilitated with the use of biometric information obtained from a computing device of a consumer. In certain exemplary embodiments, biometric information may be captured from a consumer interface used by a consumer to enter a compound consumer input configured to initiate a command. For example, a consumer may provide a compound consumer input using a touchscreen to indicate a command, while the same touchscreen interaction may be used to obtain a fingerprint of the consumer. In other examples, different consumer interface interactions may be used to indicate a command and to obtain biometric information. For example, a photo of the consumer may be captured to obtain biometric information, while a touchscreen interaction may indicate a command. Nonetheless, in some cases, the touchscreen interaction of the consumer with the consumer interface may automatically trigger an audio-visual input device to be activated in the computing device in order to capture biometric information. The concurrent use of the consumer interface in indicating a command and in providing biometric information on the consumer, in certain embodiments, enables efficient and non-intrusive incorporation of the biometric information into the command execution process, while avoiding the need for additional steps in which the biometric information is collected and analyzed.

Figure 16:
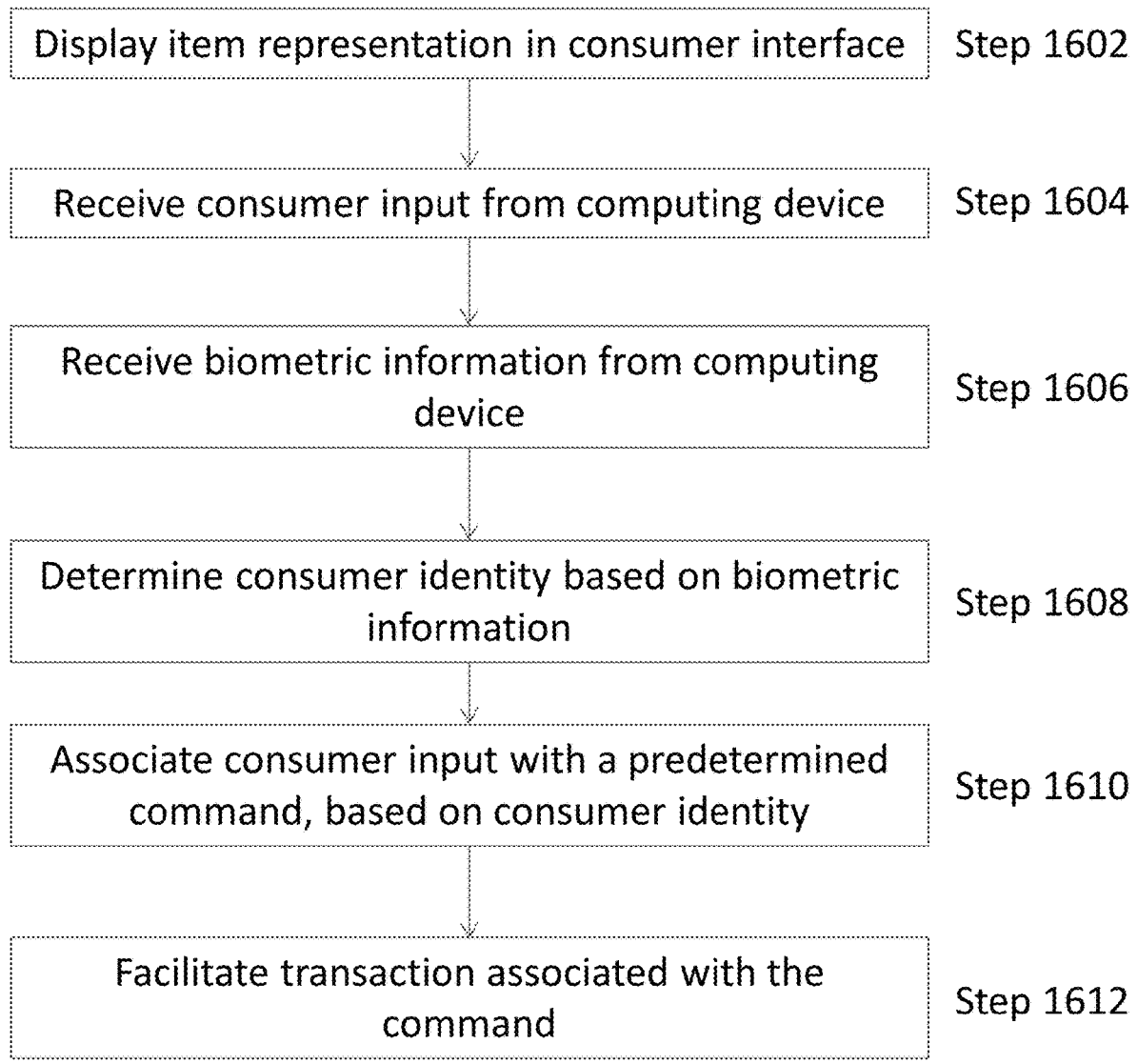
FIG. 16 shows an example method of using biometric information received from a consumer.

FIG. 16 is a flowchart illustrating an exemplary computer-executed method for facilitating a transaction. In step 1602, computer-executable instructions may be transmitted (e.g., by a promotion server) to cause a representation of an item (e.g., an impression of a promotion) to be displayed on a consumer interface rendered on a visual display of a computing device associated with a consumer. In step 1604, an indication of a compound consumer input may be received from the consumer interface. The consumer input may be associated with the representation of the item, for example, as a selection of the item. In step 1606, biometric information may also be received from the computing device in association with the consumer or any other user of the computing device. In certain embodiments, upon receiving the consumer input, a sensor in the computing device may be automatically activated to obtain the biometric information from the consumer.

In step 1608, an identity of the consumer may be determined automatically based on the biometric information. In step 1610, based on the determined identity, the consumer input received may be associated with a particular command that was predetermined to be associated with the consumer input for that particular consumer. In step 1612, computer-executable instructions may be transmitted to facilitate a transaction associated with the command with respect to the item, e.g., a purchase command associated with a promotion.

In one example, an indication of a second consumer input and second biometric information may be received from the same consumer interface. A second consumer identity may be automatically determined from the received second biometric information. Based on the second identity, the second consumer input may be associated with a second predetermined command, and a second transaction associated with the second command may be facilitated. For example, consumer input that enters the letter "b" may be associated with a purchase command for a first consumer but with a favorite command for a second consumer.

In another example, an indication of a second consumer input and second biometric information may be received from a second consumer interface displayed on a second computing device.

The use of biometric information in method in FIG. 16 enables different users of a computing device to customize the meaning of their consumer input and allow them to define shortcuts and keywords for initiating commands. Rather than requiring a computing device user to manually log in or to indicate identification information, exemplary embodiments use biometric information to automate the process and to allow efficient and speedy initiation of transactions.

In certain exemplary embodiments, the biometric information may also be used to authenticate a consumer's identity, for example, that the information corresponds to a consumer predetermined to be associated with a computing device. If the biometric information does not relate to the expected consumer, then a command entered by the consumer may not be allowed in certain examples.

In certain exemplary embodiments, based on the biometric information identifying the consumer, prior stored payment information may be retrieved for the consumer and used to facilitate the transaction.

Exemplary biometric information used in embodiments may include, but is not limited to, image information, video information, sound information, voiceprint information, fingerprint information, eye identification information, or physiological information associated with the consumer.

In certain embodiments, a consumer input definition interface may be displayed on the consumer interface to allow a consumer to define a compound consumer input that, when entered, will initiate a particular command. The consumer input definition interface may include an indication of the command. Input definition data may be received from the consumer input definition interface to define a consumer interaction. The compound consumer input may be generated based on the input definition data and associated with the command. In some cases, the compound consumer input may be the same consumer interaction defined by the input definition data or an approximation thereof. The association between the compound consumer input generated and the command may be stored on a non-transitory storage device for the particular consumer. In some embodiments, the association may be stored in association with biometric information on the consumer so that detection of the biometric information identifying the consumer may be used to interpret consumer input received from the consumer. For example, different consumers may define the same compound consumer input to initiate execution of different commands. In this case, determination of the identity of a consumer using the consumer's biometric information (as received from a consumer interface, in some cases) may enable an application program to initiate execution of an appropriate command that is associated with a compound consumer input received from the consumer.

In certain embodiments, a second consumer input definition interface may be displayed on a second consumer interface to allow a second consumer to define a second compound consumer input that, when entered, will initiate a second command. The second consumer input definition interface may include an indication of the second command. Input definition data may be received from the second consumer input definition interface to define a consumer interaction. The second compound consumer input may be generated based on the input definition data and associated with the second command. In some cases, the second compound consumer input may be the same consumer interaction defined by the input definition data or an approximation thereof. The association between the second compound consumer input generated and the second command may be stored on a non-transitory storage device for the second consumer. In some embodiments, the association may be stored in association with biometric information on the second consumer so that detection of the biometric information identifying the second consumer may be used to interpret consumer input received from the second consumer.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

That which is claimed is:

1. A system comprising at least a processor, and a memory associated with the processor having computer coded instructions therein, with the computer coded instructions configured to, when executed by the processor, cause the system to:
    display a representation of an item on a touch-screen visual display of a computing device, wherein the representation of the item is displayed in association with an electronic marketplace;
    generate compound consumer input data in response to a compound consumer input performed by a user on the touch-screen visual display of the computing device, wherein the compound consumer input comprises a continuous touch interaction with the touch-screen visual display and the compound consumer input data comprises a pattern or a shape of the compound consumer input;
    associate a first portion of the pattern or the shape of the compound consumer input in the compound consumer input data with a first command of the electronic marketplace;
    associate a second portion of the pattern or the shape of the compound consumer input in the compound consumer input data with a second command of the electronic marketplace, wherein the first command or the second command is a purchase command; and
    in response to associating the first portion or the second portion of the pattern or the shape of the compound consumer input in the compound consumer input data with the purchase command, the system is further configured to:
        cause purchase of the item via the electronic marketplace; and
        display a confirmation of the purchase command on the touch-screen visual display of the computing device.

2. The system of claim 1, wherein the touch-screen visual display of the computing device is further configured to display a representation of an electronic shopping cart or a representation of a purchase drop region, and wherein the purchase command is configured to be initiated upon detection of the compound consumer input data representing the compound consumer input overlapping with the representation of the electronic shopping cart or the representation of the purchase drop region.

3. The system of claim 1, wherein at least the portion of the pattern or the shape of the compound consumer input associated with the purchase command comprises a continuous path from a first point to a second point, the continuous path from the first point to the second point is linear or approximately linear within some tolerance.

4. The system of claim 3, wherein the pattern or the shape of the compound consumer input in the compound consumer input data further comprises data indicative of a third point on the continuous path between the first point and the second point, such that the at least the portion of the pattern or the shape of the compound consumer input in the compound consumer input data associated with the purchase command includes the first point, the second point, and the third point.

5. The system of claim 4, wherein the first point, the second point, and the third point are not collinear.

6. The system of claim 5, wherein the first point, the second point, and the third point are indicative of a checkmark.

7. The system of claim 1, wherein the portion of the pattern or the shape of the compound consumer input corresponding to the purchase command comprises a symbol associated with the purchase command.

8. The system of claim 7, wherein the symbol is a letter or number.

9. The system of claim 8, wherein the symbol comprises the letter B, such that receipt of compound consumer input data indicative of the letter B is configured to cause execution of the purchase command.

10. The system of claim 8 further configured to associate the first portion or the second portion of the pattern or the shape of the compound consumer input with the purchase command based at least in part on a language associated with the user or the computing device, such that the letter or number is detected in the language associated with the user or the computing device.

11. The system of claim 10 further configured to:
    determine a location of the computing device;
    determine a language associated with the location; and set the language associated with the user or the computing device as the language associated with the location.

12. The system of claim 7, wherein the symbol is predefined by the user in association with the purchase command.

13. The system of claim 1, further configured to:
receive payment data from the computing device, wherein causing purchase of the item via the electronic marketplace comprises facilitating the purchase using the payment data.

14. The system of claim 13, wherein at least the portion of the pattern or the shape of the compound consumer input in the compound consumer input data associated with the purchase command is user-specific, such that the system is further configured to associate the purchase command with the user upon detection of the portion of the pattern or the shape of the compound consumer input.

15. The system of claim 1, further configured to:
detect, in the compound consumer input data, at least one of a time period during which the compound consumer input is provided at the touch-screen visual display of the computing device and a distance on the touch-screen visual display covered by the compound consumer input; and
upon determining that the time period or the distance does not satisfy a predetermined time threshold, display a purchase confirmation interface configured to enable user input for confirming or rejecting the purchase command.

16. The system of claim 1, wherein the touch-screen visual display of the computing device is configured to display a geographical map of a plurality of locations at which the item may be purchased, and wherein a location of the compound consumer input data relative to the displayed geographical map corresponds to a geographical location for which the item is purchased.

17. The system of claim 1, wherein the system is further configured to execute the first and second commands concurrently.

18. The system of claim 1, wherein the system is further configured to execute the first and second commands sequentially in an order in which their corresponding portions of the pattern or the shape are entered by the user.

19. A computer-executed method for facilitating a transaction, the method comprising:
displaying a representation of an item on a touch-screen visual display of a computing device, wherein the representation of the item is displayed in association with an electronic marketplace;
generating compound consumer input data in response to a compound consumer input performed by a user on the touch-screen visual display of the computing device, wherein the compound consumer input data comprises a pattern or a shape of the compound consumer input;
associating a first portion of the pattern or the shape of the compound consumer input in the compound consumer input data with a first command of the electronic marketplace;
associating a second portion of the pattern or the shape of the compound consumer input in the compound consumer input data with a second command of the electronic marketplace, wherein the first command or the second command is a purchase command; and
in response to associating the first portion or the second portion of the pattern or the shape of the compound consumer input in the compound consumer input data with the purchase command:
causing purchase of the item via the electronic marketplace; and
displaying a confirmation of the purchase command on the touch-screen visual display of the computing device.

20. The computer-executed method of claim 19, further comprising displaying a representation of an electronic shopping cart or a representation of a purchase drop region, and wherein the purchase command is configured to be initiated upon detection of the compound consumer input data representing the compound consumer input overlapping with the representation of the shopping cart representation or the representation of the purchase drop region.

21. The computer-executed method of claim 19, wherein at least the portion of the pattern or the shape of the compound consumer input associated with the purchase command comprises a continuous path from a first point to a second point, the continuous path from the first point to the second point is linear or approximately linear within some tolerance.

22. The computer-executed method of claim 21, wherein the pattern or the shape of the compound consumer input in the compound consumer input data further comprises data indicative of a third point on the continuous path between the first point and the second point, such that the at least the portion of the pattern or the shape of the compound consumer input in the compound consumer input data associated with the purchase command includes the first point, the second point, and the third point.

23. The computer-executed method of claim 22, wherein the first point, the second point, and the third point are not collinear.

24. The computer-executed method of claim 23, wherein the first point, the second point, and the third point are indicative of a checkmark.

25. The computer-executed method of claim 19, wherein the portion of the pattern or the shape of the compound consumer input corresponding to the purchase command comprises a symbol associated with the purchase command.

26. The computer-executed method of claim 25, wherein the symbol is a letter or number.

27. The computer-executed method of claim 26, wherein the symbol comprises the letter B, such that receipt of compound consumer input data indicative of the letter B is configured to cause execution of the purchase command.

28. The computer-executed method of claim 26, further comprising associating the first portion or the second portion of the pattern or the shape of the compound consumer input with the purchase command based at least in part on a language associated with the user or the computing device, such that the letter or number is detected in the language associated with the user or the computing device.

29. The computer-executed method of claim 28 further comprising:
determining a location of the computing device;
determining a language associated with the location; and
setting the language associated with the user or the computing device as the language associated with the location.

30. The computer-executed method of claim 25, wherein the symbol is predefined by the user in association with the purchase command.

31. The computer-executed method of claim 19, further comprising:

receiving payment data from the computing device, wherein causing purchase of the item via the electronic marketplace comprises facilitating the purchase using the payment data.

32. The computer-executed method of claim 31, wherein at least the portion of the pattern or the shape of the compound consumer input in the compound consumer input data associated with the purchase command is user-specific, such that the method further comprises associating the purchase command with the user upon detection of the portion of the pattern or the shape of the compound consumer input.

33. The computer-executed method of claim 19, further comprising:
    detecting, in the compound consumer input data, at least one of a time period during which the compound consumer input is provided at the touch-screen visual display of the computing device and a distance on the touch-screen visual display covered by the compound consumer input; and
    upon determining that the time period or the distance does not satisfy a predetermined time threshold, displaying a purchase confirmation interface configured to enable user input for confirming or rejecting the purchase command.

34. The computer-executed method of claim 19, further comprising displaying a geographical map of a plurality of locations at which the item may be purchased, and wherein a location of the compound consumer input data relative to the displayed geographical map corresponds to a geographical location for which the item is purchased.

35. The computer-executed method of claim 19, further comprising:
    executing the first and second commands concurrently.

36. The computer-executed method of claim 19, further comprising:
    executing the first and second commands sequentially in an order in which their corresponding portions of the pattern or the shape are entered by the user.

37. A computer-executed method for facilitating a transaction, the method comprising:
    displaying a representation of an item on a touch-screen visual display of a computing device, wherein the representation of the item is displayed in association with an electronic marketplace;
    determining, via a processor, a geographic location of the computing device;
    determining, via the processor, a language associated with the geographic location of the computing device;
    in response to determining the language associated with the geographic location of the computing device, assigning, via the processor, the language associated with the geographic location as an assigned language associated with a user of the computing device;
    generating compound consumer input data in response to a compound consumer input performed by the user on the touch-screen visual display of the computing device, wherein the compound consumer input data comprises a pattern or a shape of the compound consumer input;
    analyzing the pattern or the shape of the compound consumer input based at least in part on the language associated with the user;
    associating at least a portion of the pattern or the shape of the compound consumer input in the compound consumer input data with a purchase command corresponding to the assigned language associated with the user, wherein associating at least the portion of the pattern or the shape of the compound consumer input comprises detecting a letter or number in the language associated with the user; and
    in response to associating the at least the portion of the pattern or the shape of the compound consumer input in the compound consumer input data with the purchase command:
        causing purchase of the item via the electronic marketplace; and
        displaying a confirmation of the purchase command on the touch-screen visual display of the computing device.

38. A computer-executed method for facilitating a transaction, the method comprising:
    displaying a plurality of representations of an item on a touch-screen visual display of a computing device in association with an electronic marketplace, wherein the plurality of representations of the item are displayed in association with a geographical map, the plurality of representations of the item corresponding to a plurality of geographic locations from which the item may be purchased;
    receiving an indication of a compound consumer input performed by a user on the touch-screen visual display of the computing device;
    generating compound consumer input data in response to receiving the indication of the compound consumer input, wherein the compound consumer input data comprises a pattern or a shape of the compound consumer input, the pattern or the shape of the compound consumer input comprising a symbol associated with a purchase command of the electronic marketplace;
    associating the symbol of the compound consumer input in the compound consumer input data with the purchase command of the item from a selected geographic location of the plurality of geographic locations by detecting that the symbol occurs at a position relative to the geographical map displayed on the touch-screen visual display corresponding to the selected geographic location from which the item may be purchased;
    in response to associating the symbol of the compound consumer input in the compound consumer input data with the purchase command from the selected geographic location:
        causing purchase of the item via the electronic marketplace from the selected geographic location; and
        displaying a confirmation of the purchase command on the touch-screen visual display of the computing device.

39. The computer-executed method of claim 38, wherein the symbol associated with the purchase command is a letter or number.

40. The computer-executed method of claim 39, wherein the symbol comprises the letter B such that detecting a compound consumer input by the user indicative of the letter B at a position on the displayed geographical map corresponding to one of the plurality of geographic locations from which the item may be purchased is configured to cause the purchase of the item from the selected geographic location.

\* \* \* \* \*